US009612623B2

(12) United States Patent
Lim et al.

(10) Patent No.: US 9,612,623 B2
(45) Date of Patent: Apr. 4, 2017

(54) MOBILE TERMINAL

(71) Applicant: LG Electronics Inc., Seoul (KR)

(72) Inventors: Cheolho Lim, Seoul (KR); Seokyong Park, Seoul (KR); Jihoon Lee, Seoul (KR); Kyungsoo Son, Seoul (KR); Choonghwan Shin, Seoul (KR); Byunghwa Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/719,388

(22) Filed: May 22, 2015

(65) Prior Publication Data

US 2016/0077548 A1 Mar. 17, 2016

(30) Foreign Application Priority Data

Sep. 16, 2014 (KR) .................. 10-2014-0122870
Oct. 20, 2014 (KR) .................. 10-2014-0141599

(51) Int. Cl.
*G06F 1/16* (2006.01)
*H04M 1/02* (2006.01)
*H04B 1/3827* (2015.01)

(52) U.S. Cl.
CPC ............ *G06F 1/166* (2013.01); *G06F 1/163* (2013.01); *G06F 1/1637* (2013.01); *G06F 1/1647* (2013.01); *G06F 1/1652* (2013.01); *H04B 1/385* (2013.01); *H04M 1/0268* (2013.01); *H04B 2001/3855* (2013.01); *H04B 2001/3861* (2013.01); *H04M 2250/16* (2013.01)

(58) Field of Classification Search
CPC ..... G06F 3/041; G06F 1/1656; H04M 1/0233

USPC .... 600/508, 587, 473, 384; 455/41.2, 456.1, 455/411, 575.8, 575.1, 520, 418; 361/679.03, 679.26, 679.01, 679.12, 361/679.09, 679.56, 679.55; 345/8, 633, 345/173, 174, 2.3, 175, 156, 547, 46, 419, 345/520

See application file for complete search history.

(56) References Cited

U.S. PATENT DOCUMENTS

| 4,847,818 | A | 7/1989 | Olsen |
| 5,260,915 | A | 11/1993 | Houlihan |
| 9,110,498 | B2* | 8/2015 | Martinez ............... A61B 5/681 |
| 2008/0146285 | A1 | 6/2008 | Lee et al. |
| 2012/0095356 | A1* | 4/2012 | Oleson ............... A63B 24/0062 600/508 |
| 2012/0182677 | A1 | 7/2012 | Seo |

(Continued)

FOREIGN PATENT DOCUMENTS

| EP | 1225751 A2 | 7/2002 |
| EP | 2698686 A2 | 2/2014 |

(Continued)

*Primary Examiner* — Hung Duong
(74) *Attorney, Agent, or Firm* — Dentons US LLP

(57) ABSTRACT

There is disclosed a mobile terminal deformable into a bar type mobile terminal including a main body in which a display unit is mounted in a front surface, and a strap coupled to both sides of the main body in a first direction to form a closed curvature shape with the main body, the strap comprising a pair of curved units, wherein the strap and the main body forming the closed curvature shape together are overlapped with each other to deform the mobile terminal into the bar type, as the curved units are folded.

20 Claims, 29 Drawing Sheets

(56) References Cited

U.S. PATENT DOCUMENTS

2013/0120106 A1 5/2013 Cauwels et al.
2013/0271392 A1 10/2013 Lyons

FOREIGN PATENT DOCUMENTS

| | | |
|---|---|---|
| JP | 2002528811 A | 9/2002 |
| KR | 1020110090698 A | 8/2011 |
| KR | 1020120111094 A | 10/2012 |
| KR | 200470456 Y1 | 12/2013 |
| KR | 101398946 B1 | 5/2014 |
| WO | 2013063276 A1 | 5/2013 |
| WO | 2014122558 A1 | 8/2014 |

\* cited by examiner

MOBILE TERMINAL

CROSS-REFERENCE TO RELATED APPLICATIONS

Pursuant to 35 U.S.C. §119(a), this application claims priority to Korean Patent Applications Nos. 10-2014-0122870 filed on Sep. 16, 2014, and 10-2014-0141599 filed on Oct. 20, 2014 in Korea, the entire contents of which is hereby incorporated by reference in its entirety.

BACKGROUND OF THE DISCLOSURE

Field of the Disclosure

Embodiments of the present disclosure relate to a mobile terminal deformable into a watch type mobile terminal and a bar type mobile terminal.

Background of the Disclosure

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device.

Efforts are ongoing to support and increase the functionality of mobile terminals. Such efforts include software and hardware improvements, as well as changes and improvements in the structural components.

Considering users' usage and portability, wearable mobile terminals have been released and watch type mobile terminals emerged as the leader among such the mobile terminals. Such a watch type mobile terminal has a curved surface which results in a disadvantage of a small screen. In addition, the watch type mobile terminal having the curved surface has another disadvantage of quite a thickness which has to be increased to mount a main board and a battery and other components in a small main body area.

When a user uses some functions, for example, making or receiving a call, it is difficult to locate an audio output unit near the ear and a microphone near the mouse in a state where the watch type mobile terminal is worn on the wrist.

SUMMARY OF THE DISCLOSURE

An object of the present disclosure is to provide a mobile terminal deformable into a watch type mobile terminal wearable on a user's wrist to carry conveniently or a bar type mobile terminal convenient to use in receiving and making a call.

Embodiments of the present disclosure may provide a mobile terminal deformable into a bar type mobile terminal including a main body in which a display unit is mounted in a front surface; and a strap coupled to both sides of the main body in a first direction to form a closed curvature shape with the main body, the strap comprising a pair of curved units, wherein the strap and the main body forming the closed curvature shape together are overlapped with each other to deform the mobile terminal into the bar type, as the curved units are folded.

The mobile terminal may further include an electronic component mounted in the strap; and a flexible board extended from an inner portion of the strap to the main body to connect the electronic component with the display unit.

The thickness of the strap may be equal to the thickness of the main body.

The strap may include a first strap having one end connected to a side of the main body; and a second strap having one end connected to the other side of the main body, and the other end of the first strap and the other end of the second strap may be detachable.

The mobile terminal may further include a hook projected from the first strap; and a hook securing portion formed in the second strap to secure the hook thereto.

The mobile terminal may further include an elastic portion applying a force to the hook to keep the secured state of the hook to the hook securing portion when the hook is pressed; and a button projected from the first strap to be pressed by a user in the reverse direction of the direction in which the force applied by the elastic portion is applied. When the user presses the button, the hook may be separated from the hook securing portion to separate the first strap and the second strap from each other.

The electronic component may include a printed circuit board mounted in the first strap and a battery mounted in the second strap, and the printed circuit board and the battery may be disconnected when the first strap and the second strap are separated and connected when the first strap and the second strap are connected.

The strap and the main body may be detachable from each other.

The mobile terminal may further include a magnet provided in a predetermined portion of the main body or the strap and another magnet having the opposite polarity to the magnet or a magnetic material, and the main body and the strap are adhered to each other by the magnetic force of the magnets when the main body and the strap are located closely as the curved units are folded.

The main body and the display unit may be flexible.

The mobile terminal may further include a plurality of unit blocks provided in an inner portion of the main body, arranged in a first direction sequentially; a slot extended from a recessed lateral surface of the unit block in a first direction; and a projection projected from the inner portion of the main body to be inserted in the slot, wherein the projection moves along the slot when the main body is deformed and angles between the unit blocks are changed to re-arrange the unit blocks, corresponding to the shape of the main body.

The mobile terminal may further include a plate spring provided in the strap, the plate spring formed of a flexible material, wherein the strap is deformed into a flat shape or a curved shape according to a curved angle of the plate spring.

The plate spring may include a rectangular outer frame having the rigidity, with an open inner space; a plurality of deformable frames provided in the outer frame to connect one first direction side of the outer frame and the other side with each other; and a middle frame traversing the plurality of the deformable frames to connect the plurality of the deformable frames with each other.

The curved unit may be a hinge having two shafts.

The mobile terminal may further include a hinge cap covering outer portions of the shafts simultaneously; and a stopper projected from the shafts, wherein the hinge is configured not to rotate any further when the stopper contacts with the hinge cap.

The mobile terminal may further include one or more of a microphone and an audio output module mounted in the strap, closer to the main body than the curved units.

The display may include a first display including a front surface and at least one lateral surface; a first support material arranged in a rear surface of the first display, with bending together with the first display, to accommodate the first display; and a strap module provided in the first support material to support the first display, and the display may be flexible and curved from a front surface to a portion of a lateral surface.

The display may further include a second display including a front surface and at least one lateral surface, the second display having a predetermined portion facing the first display; a second support material arranged in a rear surface of the second display, with bending together with the second display, to accommodate the second display, and the display may be flexible and curved from a front surface to a portion of a lateral surface, and a shape of the strap module may be corresponding to shapes of the first and second displays.

Each of the first display and the second display may include a first flat portion and a second flat portion formed flat in the front or the rear surface; and a first curved portion and a second curved portion curved from the first flat portion and the second flat portion, respectively.

A hook may be formed in each of the first and second support materials and a hook securing portion may be formed in a preset portion of the strap module to make the hook be movable therein.

The hook and the hook securing portion may be formed in the first curved portion or the second curved portion. A restricting portion may be formed in the hook securing portion to be coupled to the hook to restrict the moving of the hook.

The first flat portion may be electrically connected to a first printed circuit board by a first connector. The second flat portion may be electrically connected to a second printed circuit board by a second connector.

A lateral surface of each of the first and second support materials may cover a lateral surface of the strap module, and a projection may be projected in a lateral surface of each of the first and second support materials, and the projection may be movable in a long hole formed in a lateral surface of the strap module.

The mobile terminal may further include a charging film provided between the first display and the first support material or the second display and the second support material.

The charging film may be connected to the first printed circuit board or the second printed circuit board by a flexible printed circuit board (FPCB).

The flexible printed circuit board may be connected to the first printed circuit board or the second printed circuit board by the first connector or the second connector exposed through a hole formed in the first support material or the second support material.

Both ends of the first display may be adjacent to both ends of the second display, and the first display adjacent to the second display may implement a first function and the second display may support the first function or implement a second function different from the first function.

The strap module may be coupled by a buckle. A receiver and an audio hole may be arranged in a portion of the buckle. A microphone may be arranged in the other portion of the buckle.

A first antenna may be arranged in the first flat portion and a second antenna may be arranged in the second flat portion, to make the function of the first display communicate with the function of the second function.

Embodiments of the present disclosure also provide a mobile terminal assembly including the watch type mobile terminal of one of claims 1 through 19, wherein an accommodating recess is formed in an outer surface of the mobile terminal to accommodate the watch type mobile terminal so as to electrically connect the watch type mobile terminal to the mobile terminal.

Embodiments of the present disclosure also provide a mobile terminal including a glass type mobile terminal having a display arranged in a front surface; and a display arranged in a rear portion of the glass type mobile terminal to display image information, wherein the glass type mobile terminal may include a rear rest supported to a rear side of the user's head, and the rear rest may include a flat stand and the display may be coupled to the stand.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein.

DESCRIPTION OF SPECIFIC EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
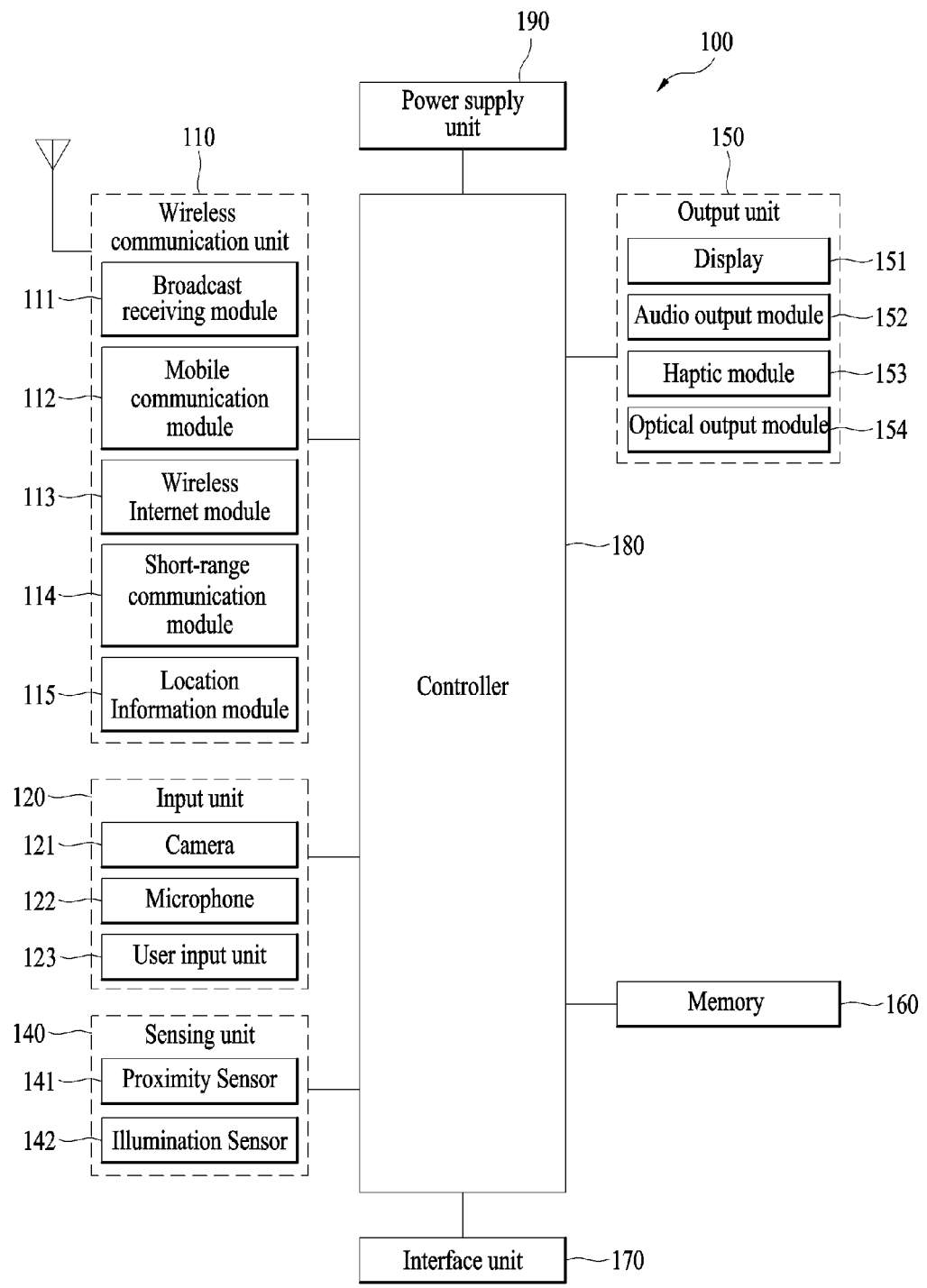
FIG. 1 is a block diagram illustrating a wearable terminal in accordance with the present disclosure.

FIG. 1 is a block diagram of a mobile terminal in accordance with the present disclosure The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs.

The controller 180 may provide or process information or functions appropriate for a user by processing signals, data, information and the like, which are input or output by the various components depicted in FIG. 1, or activating application programs stored in the memory 170. As one example, the controller 180 controls some or all of the components illustrated in FIG. 1 according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Figure 2:
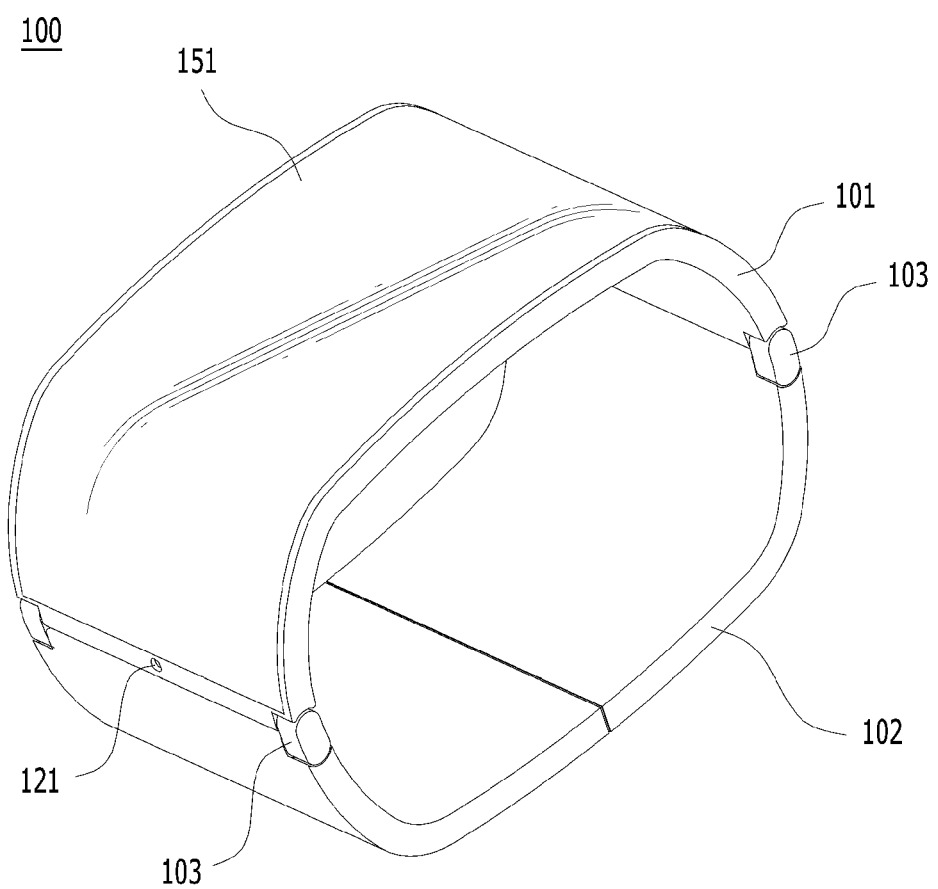
FIG. 2 is a perspective diagram illustrating a first status of a mobile terminal in accordance with one embodiment of the present disclosure.
Figure 3:
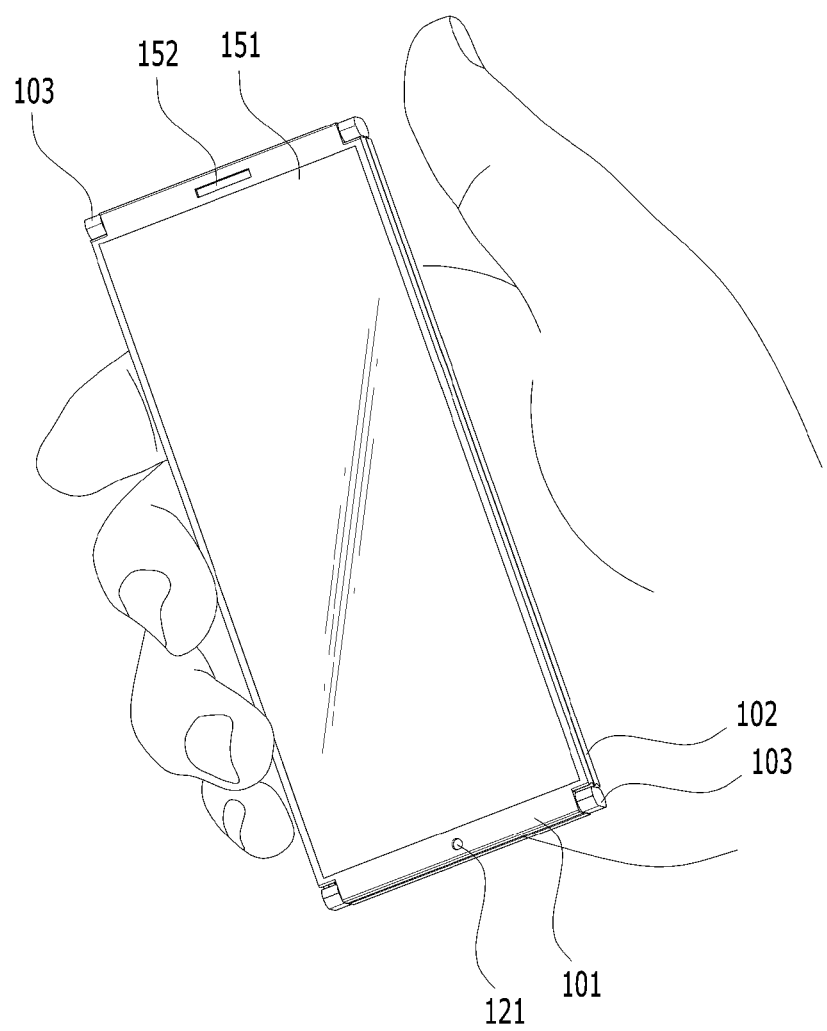
FIG. 3 is a perspective illustrating a second status of the mobile terminal shown in FIG. 2.

FIG. 2 is a perspective diagram illustrating a first status of a mobile terminal in accordance with one embodiment of the present disclosure. FIG. 3 is a perspective illustrating a second status of the mobile terminal shown in FIG. 2.

The mobile terminal in accordance with the present disclosure may be deformable as shown in FIGS. 2 and 3. A first status is a wrist type mobile terminal or a watch type terminal (see FIG. 2) wound around the user's hand to be used and a second status is a bar type mobile terminal having a flat display unit 151 arranged in a front thereof like a typical bar type (see FIG. 3).

As it is wound around the user's hand in the first status, the mobile terminal forms a closed curvature shape along a circumference of the user's wrist. As curved units 103 arranged in both sides of the closed curvature shape of the first status are folded to be overlapped, the second status may be deformable into two-layered bar type mobile terminal. the curved units 103 are folded to zero degree (0°) to keep the two-layer overlapped bar type in the second status and to less than 180 degrees to be wound around the user's wrist in the first status.

The mobile terminal in accordance with the present disclosure includes a main body 101 having the display unit 151 mounted in a front surface thereof and a strap 102 connected to a first direction sides of the main body 101 to form the closed curvature shape together with the main body 101. The strap 102 has the curved unit 103 deformable at various angles. When the angle of the curved unit 103 is changed to make the strap 102 and the main body 101 overlapped with each other, the mobile terminal is deformed into the bar type mobile terminal shown in FIG. 3.

At this time, the main body 101 and the strap 102 may be formed of a flexible material or a plurality of plate-shaped modules. Angles between the plate-shaped modules are varied to change an overall curvature of the mobile terminal.

Figure 4:
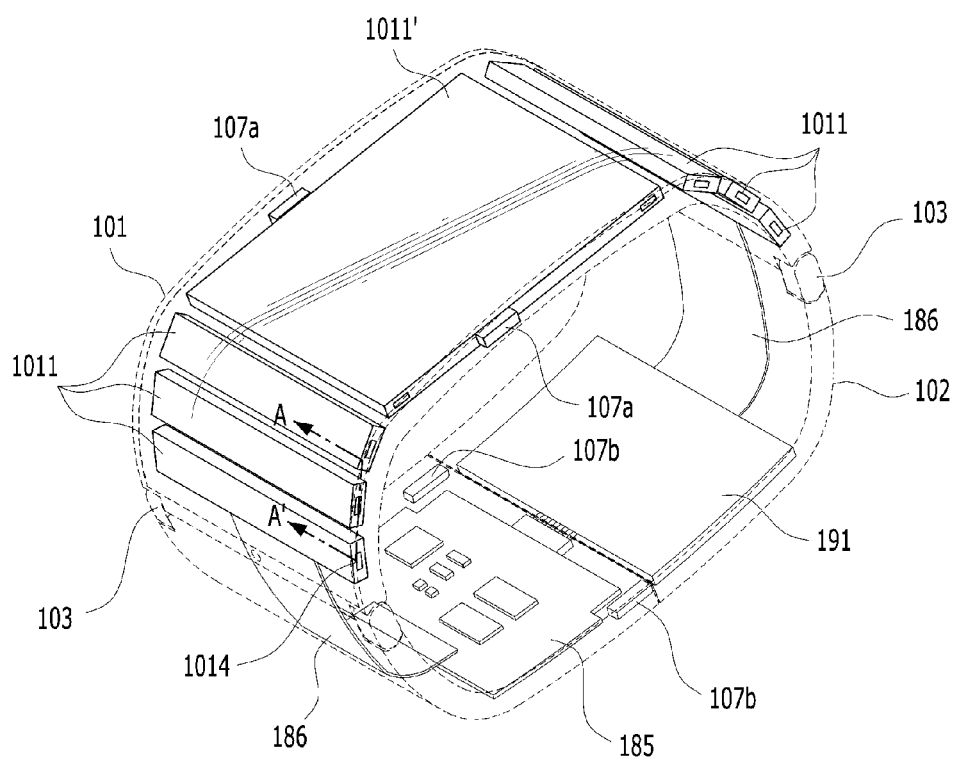
FIG. 4 is a perspective diagram illustrating a strap unit of the mobile terminal shown in FIG. 2.

FIG. 4 is a perspective diagram illustrating one embodiment of the mobile terminal shown in FIG. 2. Magnets 107a and 107b may be provided in one or more portions of the mobile terminal to prevent the strap 102 and the main body 101 overlapped with each other to keep the second status from separating from each other. When a magnet 107a is provided in the main body 101, another magnet 107b having the opposite polarity is provided in the strap 102 or a magnetic material 107b having a force pulled by a magnetic force of the magnet 107a may be provided in the strap 102, and vice versa.

When the strap 102 and the main body 101 are closer to each other in the first status, the magnetic forces of the magnets 107a and 107b make the strap 102 and the main body 101 adhere to each other so that the first status may be deformed into the second status. When some force is applied to the second status, the strap 102 and the main body 101 are separated from each other so that the second status may be deformed into the first status.

The main body 101 of the mobile terminal in accordance with the one embodiment of the present disclosure shown in FIG. 2 is formed of a flexible material and it is deformable from a flat shape into a curved shape. The main body 101 is deformable into a curved shape in the first status to be wound around the user's wrist as shown in FIG. 2. The main body 101 is deformable into the flat shape in the second status shown in FIG. 3 to be the bar type mobile terminal.

The overall area of the main body 101 may be formed of a flexible material or a predetermined area of the main body 101 may be kept linear and the other area is partially curved to be deformable into the curved shape.

The display unit 151 mounted in the main body 101 has to be deformable according to the changed shape of the main body 101. In this figure, mobile terminal 200 is shown having display unit 251, which is a type of display that is deformable by an external force. This deformation, which includes display unit 151 and other components of mobile terminal 200, may include any of curving, bending, folding, twisting, rolling, and combinations thereof. The deformable display unit 151 may also be referred to as a "flexible display unit." In some implementations, the flexible display unit 151 may include a general flexible display, electronic paper (also known as e-paper), and combinations thereof. In general, mobile terminal 100 may be configured to include features that are the same or similar to that of mobile terminal 100 of FIGS. 1-3.

The flexible display of mobile terminal 100 is generally formed as a lightweight, non-fragile display, which still exhibits characteristics of a conventional flat panel display, but is instead fabricated on a flexible substrate which can be deformed as noted previously.

The term e-paper may be used to refer to a display technology employing the characteristic of a general ink, and is different from the conventional flat panel display in view of using reflected light. E-paper is generally understood as changing displayed information using a twist ball or via electrophoresis using a capsule.

When in a configuration that the flexible display unit 151 is not deformed (for example, in a configuration with an infinite radius of curvature and referred to as a first configuration), a display region of the flexible display unit 151 includes a generally flat-surface. When in a configuration that the flexible display unit 151 is deformed from the first configuration by an external force (for example, a configuration with a finite radius of curvature and referred to as a second configuration), the display region may become a curved surface or a bent surface. As illustrated, information displayed in the second configuration may be visual information output on the curved surface. The visual information may be realized in such a manner that a light emission of each unit pixel (sub-pixel) arranged in a matrix configuration is controlled independently. The unit pixel denotes an elementary unit for representing one color.

According to one alternative embodiment, the first configuration of the flexible display unit 151 may be a curved configuration (for example, a configuration of being curved from up to down or from right to left), instead of being in flat configuration. In this embodiment, when an external force is applied to the flexible display unit 151, the flexible display unit 151 may transition to the second configuration such that the flexible display unit is deformed into the flat configuration (or a less curved configuration) or into a more curved configuration.

If desired, the flexible display unit 151 may implement a flexible touch screen using a touch sensor in combination with the display. When a touch is received at the flexible touch screen, the controller 180 can execute certain control corresponding to the touch input. In general, the flexible touch screen is configured to sense touch and other input while in both the first and second configurations.

One option is to configure the mobile terminal 100 to include a deformation sensor which senses the deforming of the flexible display unit 151. The deformation sensor may be included in the sensing unit 140.

The deformation sensor may be located in the flexible display unit 151 or the case 101 to sense information related to the deforming of the flexible display unit 151. Examples of such information related to the deforming of the flexible display unit 151 may be a deformed direction, a deformed degree, a deformed position, a deformed amount of time, an acceleration that the deformed flexible display unit 151 is restored, and the like. Other possibilities include most any type of information which can be sensed in response to the curving of the flexible display unit or sensed while the flexible display unit 151 is transitioning into, or existing in, the first and second configurations.

In some embodiments, controller 180 or other component can change information displayed on the flexible display unit 151, or generate a control signal for controlling a function of the mobile terminal 100, based on the information related to the deforming of the flexible display unit 151. Such information is typically sensed by the deformation sensor.

The mobile terminal 100 is shown having a case 101 for accommodating the flexible display unit 151. The case 101 can be deformable together with the flexible display unit 151, taking into account the characteristics of the flexible display unit 151.

A battery (not shown in this figure) located in the mobile terminal 100 may also be deformable in cooperation with the flexible display unit 161, taking into account the characteristic of the flexible display unit 151. One technique to implement such a battery is to use a stack and folding method of stacking battery cells. When the mobile terminal 100 is the first status, the strap 102 is deformable into a curved shape. When the mobile terminal 100 is the second status, the strap 102 is unfolded to be a flat surface. The strap 102 may be formed of a flexible material, for example, silicon.

Meanwhile, as shown in FIG. 4 which is a perspective diagram illustrating the strap 102 of the mobile terminal shown in FIG. 2, a plurality of unit blocks 1011 may be sequentially arranged in a first direction side by side. The unit blocks 1011 may be connected with each other by a hinge structure or a flexible structure to change angels between the unit blocks 1011.

Only the display unit 151 may be arranged in the main body 101 and some components including the main board 185 and the battery 191 may be arranged in the strap 102. When electronic components are arranged only in the main body 101, the main body 101 cannot but get too thick. In case the main body 101 gets thick, the mobile terminal may be a watch type. In case electronic components are uniformly arranged in the main body 101 and the strap 102, the mobile terminal may be a bracelet type.

When some components are arranged in the strap 102, some area of the strap 102 is deformable into a curved surface and the main board 185 and the battery 191 may be arranged in the other area which is formed of a hard material not deformed into the curved surface. A flexible board 186 shown in FIG. 4 may be provided to connect the display unit 151 of the main body 101 with the main board 185 and the battery 191.

The flexible board 186 may be deformable, corresponding to the deformation of the strap 102, and it may be provided in the strap 102. The flexible board 186 may be extended from the main board 185 or the battery 191 to the main body and connect the display 151 with the main board 185 to control the display unit 151.

Figure 5:
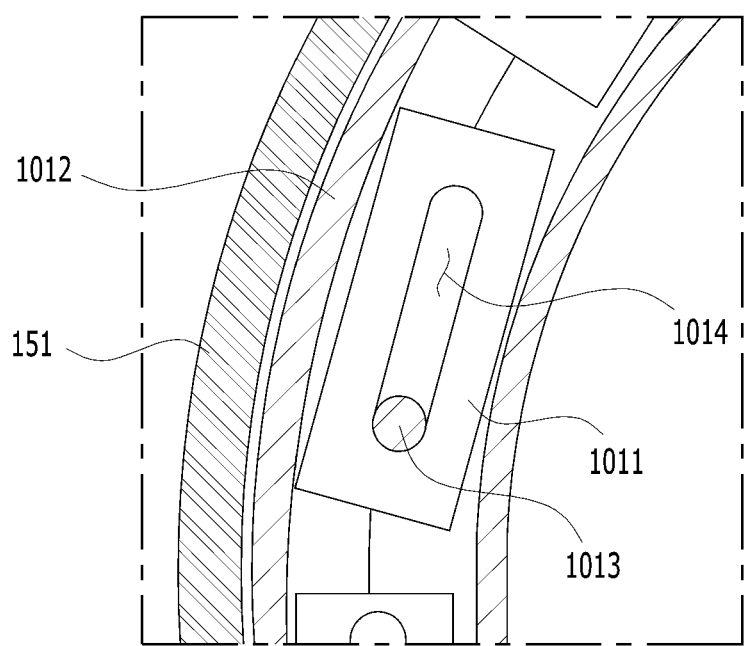
FIG. 5 is a sectional diagram illustrating a main body of the mobile terminal shown in FIG. 2.

An overall area of the main body 101 may be formed of a flexible material. In this instance, the rigidity of the main body could deteriorate disadvantageously. To compensate the rigidity, an outer portion of the main body 101 is covered by a deformable housing 1012 formed of a flexible material as shown in FIG. 5. A plurality of unit blocks 1011 may be arranged in the main body in a first direction side by side. A flat portion shown in FIG. 4 may be one unit block 1011.

A projection 1013 projected from an inner space of the deformable housing 1012 toward a lateral surface of the unit block 1011 is inserted in a slot 1014 extended from the lateral surface of the unit block 1011 in a first direction. As the deformable housing 1012 is curved, the projection may move along the slot 1014 and a gap and an angle between each two unit blocks 1011 may change, only to curve the main body 101 with forming a curvature shape shown in FIG. 2.

Figure 6:
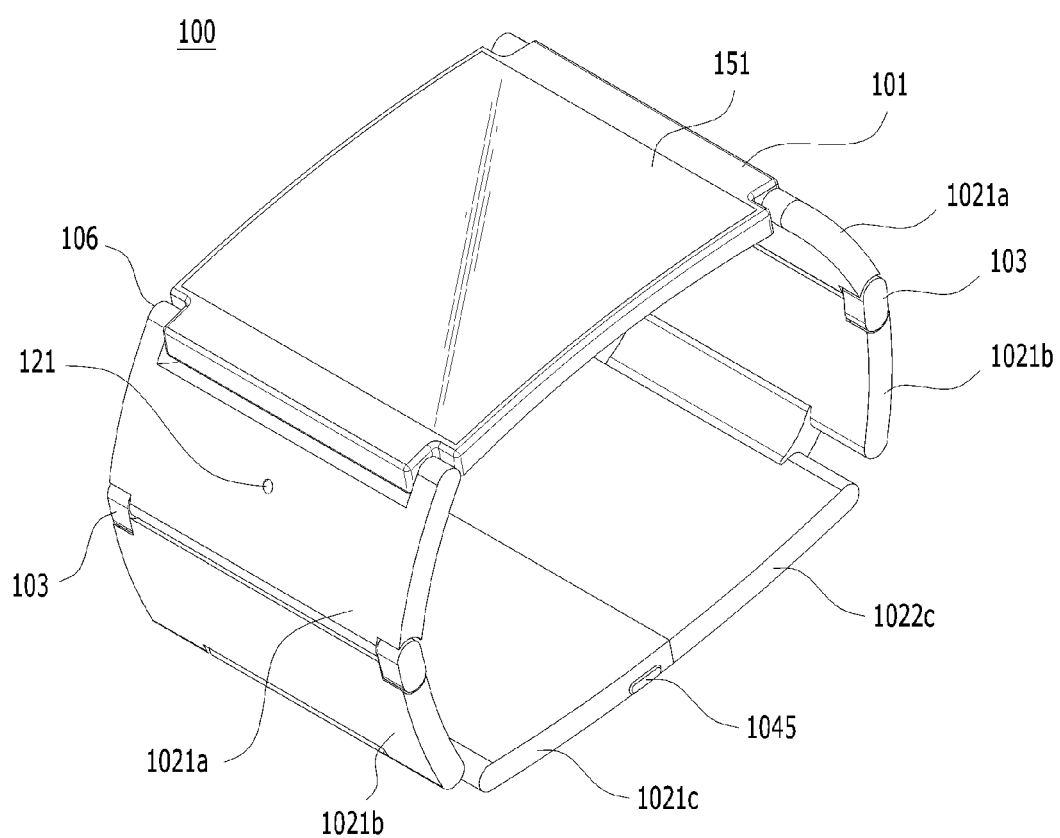
FIG. 6 is a perspective diagram illustrating a first status of a mobile terminal in accordance with another embodiment of the present disclosure.
Figure 7:
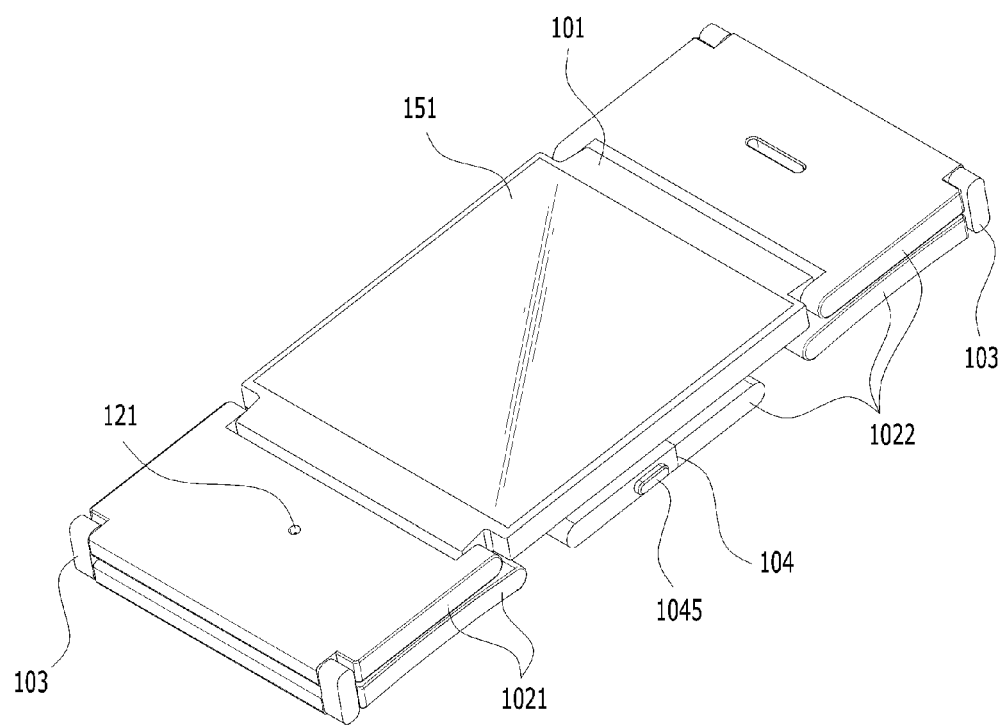
FIG. 7 is a perspective illustrating a second status of the mobile terminal shown in FIG. 6.

FIG. 6 is a perspective diagram illustrating a first status of a mobile terminal in accordance with another embodiment of the present disclosure. FIG. 7 is a perspective illustrating a second status of the mobile terminal shown in FIG. 6.

A curved unit 103 in accordance with this embodiment is arranged in a middle area of the strap 102. The main body 101 and the strap 102 are connected with each other by an auxiliary hinge 106. The curved unit 103 has to be folded to 0° but an angle of the hinge for connecting the main body 101 and the strap 102 with each other only can be changeable within 180°.

The display unit 151 is arranged in the main body 101 in accordance with this embodiment. The main body 101 where the display unit 151 is arranged is smaller than the main body 101 in accordance with the embodiment mentioned above, so that it may be kept linear, not transit to the curved surface and that an angle between the strap 102 and the main body 101 may change to deform the mobile terminal into the first status or the second status.

When the main body 101 is deformable from the flat shape into the shape curved along the first direction which is a direction around the user's wrist, the main body 101 may be formed longer in comparison to the main body 101 not deformable into the curved shape. Accordingly, the size of the display unit 151 may be increased. In this instance, the length of the strap 102 is relatively reduced. Especially, strap portions 1021a and 1022a near the main body from the curved unit 103 may be shorter.

As shown in FIG. 7, a microphone 121 or an audio output module 152 may be provided in the strap portions 1021a and 1022a near the main body 101 so that the user may input the user's voice via the microphone 121, with the audio output module 152 near the ear like the bar type mobile terminal.

Figure 8:
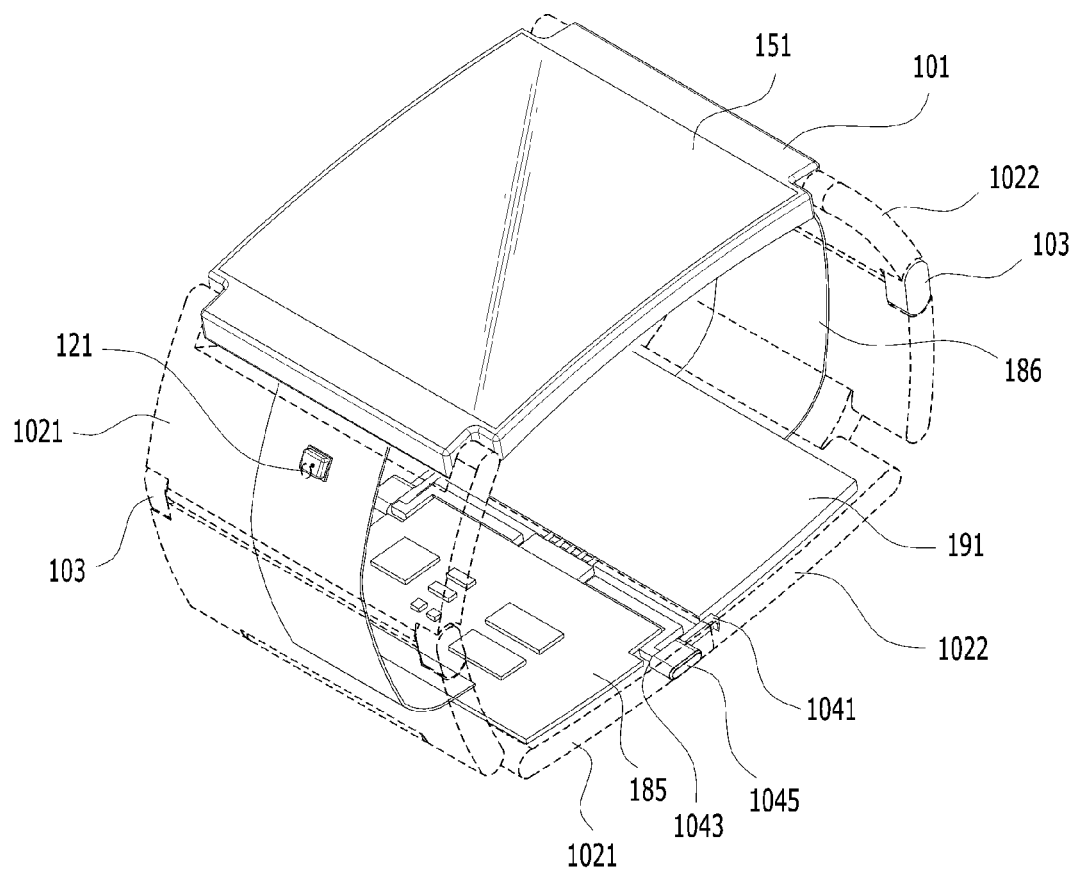
FIG. 8 is a perspective diagram illustrating a strap unit of the mobile terminal shown in FIG. 6.

FIG. 8 is a perspective diagram illustrating the mobile terminal shown in FIG. 6. The main board 185 and the battery 191 may be arranged in the strap.

Figure 9:
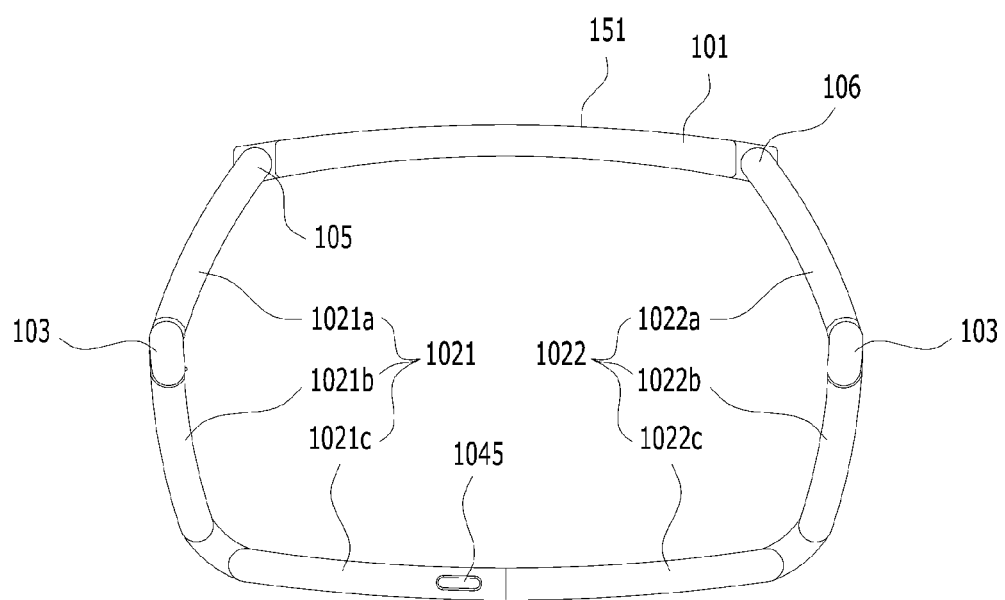
FIG. 9 is a side view illustrating the mobile terminal shown in FIG. 6.

When the electronic components are intensively arranged only in the main body 101, the main body 101 is thick. When the electronic components are dispersedly arranged in the strap 102, the mobile terminal 100 having the uniform thickness shown in FIG. 9 which is a side view of the mobile terminal shown in FIG. 6 may be realized. Using the flexible board 186 connecting the main board 185 and the battery 191 with the display unit 15, the display unit 151 may be controlled and a required electric power may be supplied to the display unit 151. At this time, the microphone and the audio output module 152 may be arranged on the flexible board 186.

Figure 10:
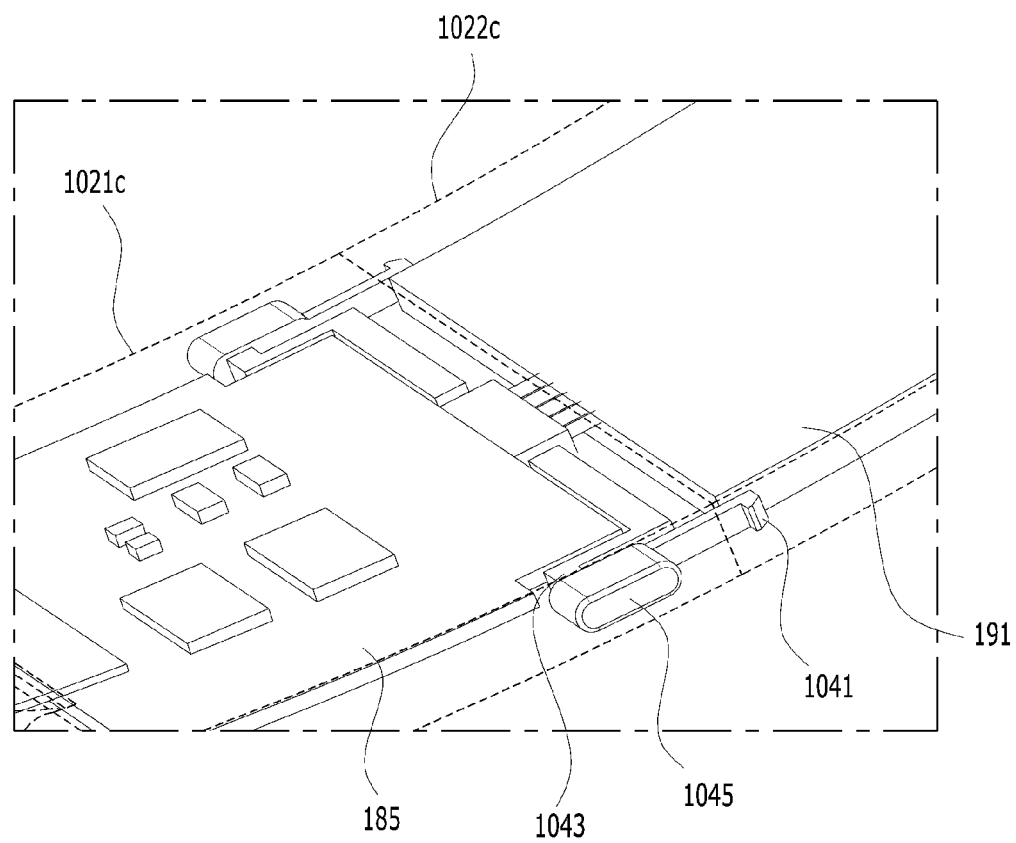
FIG. 10 is a perspective diagram illustrating a strap connection unit of the mobile terminal shown in FIG. 6.

The strap 102 has to be separated or a gap has to be formed between the strap 102 and the main body 101, to make the mobile terminal wearable on the user's wrist. The gap generated by the separation of the strap 102 and the main body 101 may be formed between the flexible board and the main board 185 or the flexible board and the battery 191. As shown in FIG. 10, the gap has to be formed between the main board 185 and the battery 191. To facilitate the description of the embodiment, the connection unit provided in the strap 102 will be applied.

The strap may include a first strap 1021 having an end connected to one portion of the main body 101 and a second strap 1022 having one end connected to the other portion of the main body 101. The other end of the first trap 1021 and the other end of the second strap 1022 may be detachable connection units 104 and the connection units may be detachable by a hook 1041.

A hook 1041 projected from the first strap 1021 is inserted in a hook securing portion formed in the second strap 1022, the first strap 1021 and the second strap 1022 are connected with each other. When the hook 1041 is separated from the hook securing portion, the first strap 1021 and the second strap 1022 are disconnected from each other. The hook 1041 includes an elastic portion to locate the hook in the hook securing portion. A button 1045 may be further provided to press the elastic portion 1043 so as to separate the hook 1041 from the hook securing portion.

When the strap 102 is separated or the gap between the strap 102 and the main body 101 is formed in case the display unit 151, the flexible board, the battery 191 and the main board 185 are connected with each other, with forming the closed curvature shape (see FIG. 8), the connection has to be disconnected and the connection unit may include a terminal to be connectable or disconnectable as shown in FIG. 10.

Figure 11:
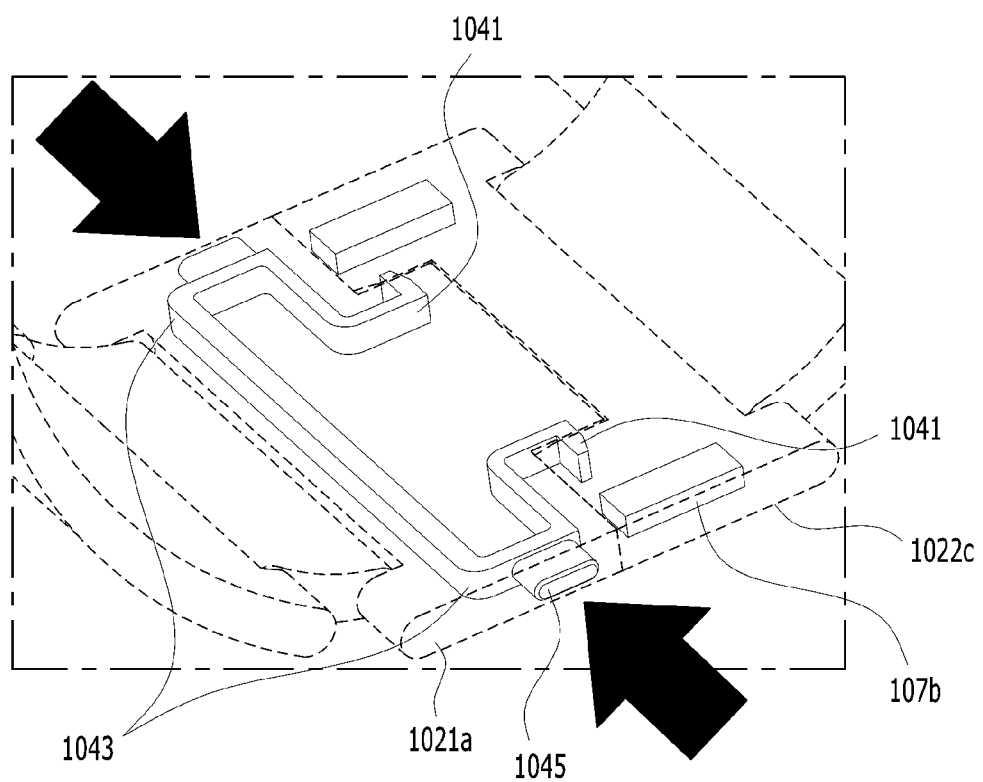
FIG. 11 is a perspective diagram illustrating another embodiment of the strap connection unit of the mobile terminal shown in FIG. 6.

FIG. 11 illustrates another embodiment of the connection unit shown in FIG. 6. The shape of the hook 1041 is different from a shape of a hook 1041 shown in FIG. 10. Even the hook 1041 shown in FIG. 11 includes the elastic portion 1043. When the button 1045 is pressed to apply the opposite force to the elasticity of the elastic portion 1043, the hook 1041 may be separated from the hook securing portion formed in the second strap 1022.

A magnet 107a provided in a predetermined portion of the main body 101 or the strap 102 and another magnet 107b or magnetic material 107b having the opposite polarity to the magnet 107a may be further provided to prevent the main body 101 and the strap 102 overlapped by the bent unit 103 folded to be the second status from being separated from each other.

When the main body 101 and the strap 102 are getting closer as the curved unit 103 is folded, the main body 101 and the strap 102 adhere to each other by a magnetic force of the magnets and they are not separated from each other.

Figure 12:
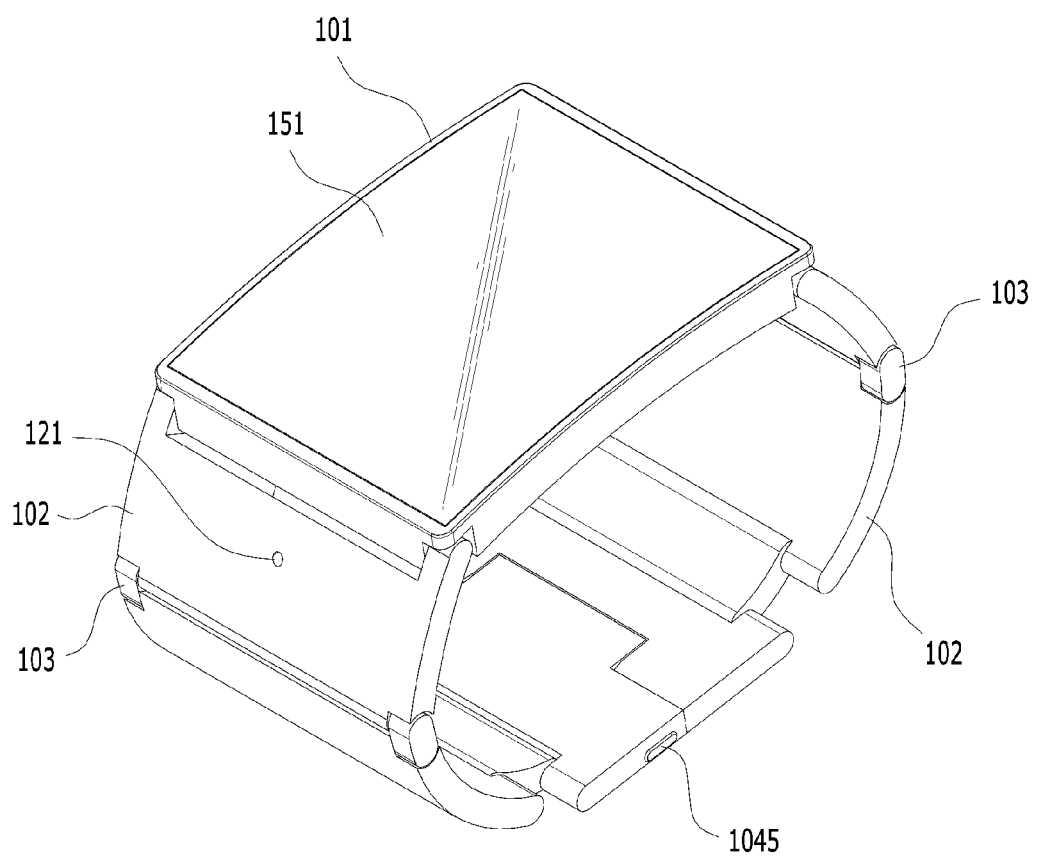
FIG. 12 is a perspective diagram illustrating a first status of a mobile terminal in accordance with a further embodiment of the present disclosure.
Figure 13:
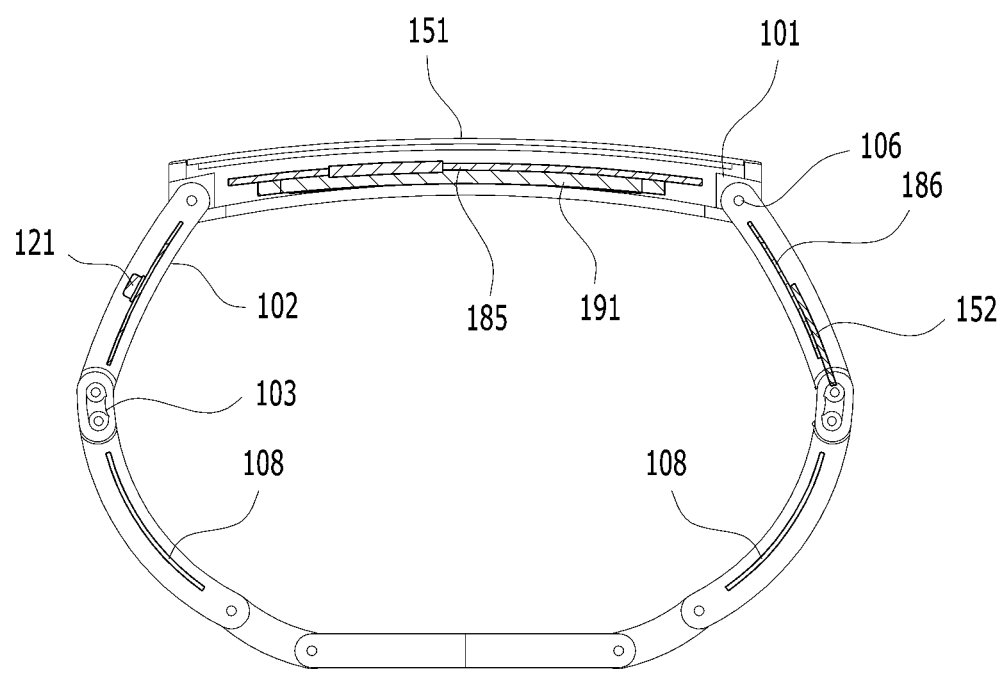
FIG. 13 is a sectional diagram illustrating the mobile terminal shown in FIG. 11.

FIG. 12 is a perspective diagram illustrating a first status of a mobile terminal in accordance with a further embodiment of the present disclosure. FIG. 13 is a sectional diagram illustrating the mobile terminal shown in FIG. 11. In this embodiment shown in FIG. 12, the main board 186 and the battery 191 arranged in the strap 102 are arranged in the main body 101 and the thin strap 102 are realized, so that a watch type mobile terminal may be provided in the first status.

A curvature of the main body 101 in this embodiment may be variable as mentioned above. Alternatively, even when the curvature is not variable, an angle between the strap 102 and the main body 101 is changed according to the curvature of the user's wrist by a hinge 106 provided between the strap 102 and the main body in the first status, so that the watch type mobile terminal can be worn on the user's wrist.

The strap 102 in this embodiment may include a flexible material partially provided in one or more portions to be woundable in the first status so as to enhance the feeling of wearing and to be unfolded flat so as to be deformable into the bar type mobile terminal.

Figure 14:
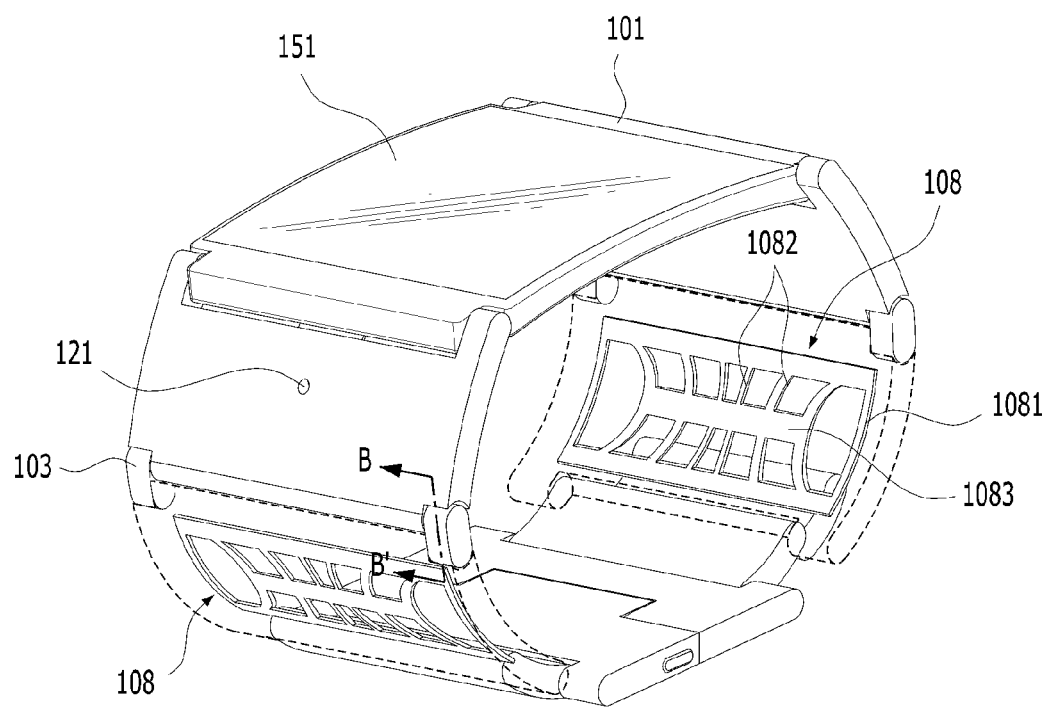
FIG. 14 is a perspective diagram illustrating a first status of a strap of the mobile terminal shown in FIG. 11.

FIG. 14 is a perspective diagram illustrating the mobile terminal shown in FIG. 12. The mobile terminal may include a plate spring 108 provided in the strap 102 to keep the first status and the second status stably. The plate spring 108 is curved to keep the curved shape of the strap 102, in case the mobile terminal is the first status. The plate spring 108 is curved reversely to keep the flat shape of the strap 102, in case the mobile terminal is the second status.

Specifically, the plate spring 108 includes a rectangular outer frame 1081 having the rigidity, with an open inner space. The outer frame 1081 is secured in the inner portion of the strap and the shape of the outer frame 1081 is not changeable. Also, the plate spring includes a plurality of deformable frames extended in a first direction within the outer frame.

A center of the deformable frame deforms the strap 102 from the curved shape into the flat shape, while moving toward the thickness of the strap 102. A middle frame 1083 traversing the deformable frames may be further provided so as to permit the plurality of the deformable frame 1082 to move in the same direction simultaneously.

Figure 15:
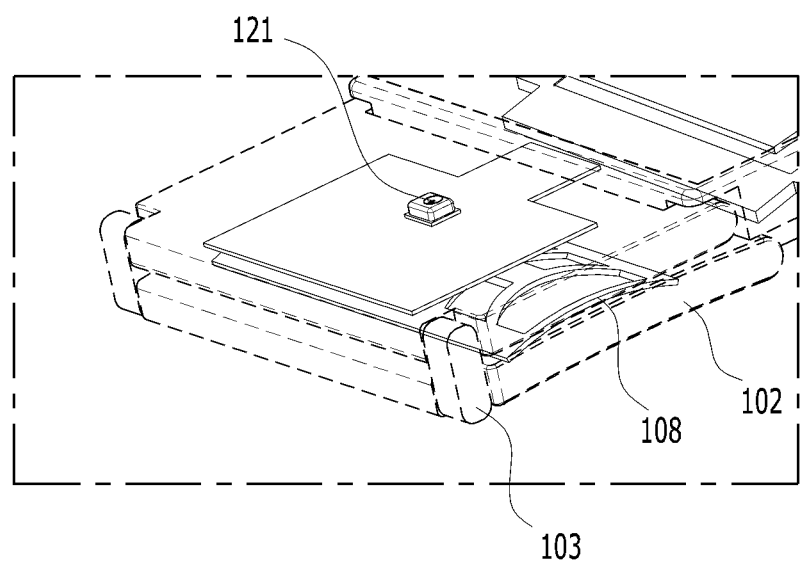
FIG. 15 is a perspective diagram illustrating a second status of the strap of the mobile terminal shown in FIG. 11.

FIG. 15 is a perspective diagram illustrating a second status of the strap 102 of the mobile terminal shown in FIG. 11. The plate spring 108 is curved in the reverse direction of the direction shown in FIG. 12 and applies a force to the strap 102 to deform the strap 102 into the flat shape. At this time, the curved unit 103 is folded to overlap both strap portions 102 with each other with respect to the curved unit 103 so as to deform the mobile terminal into the bar type terminal.

Figure 16:
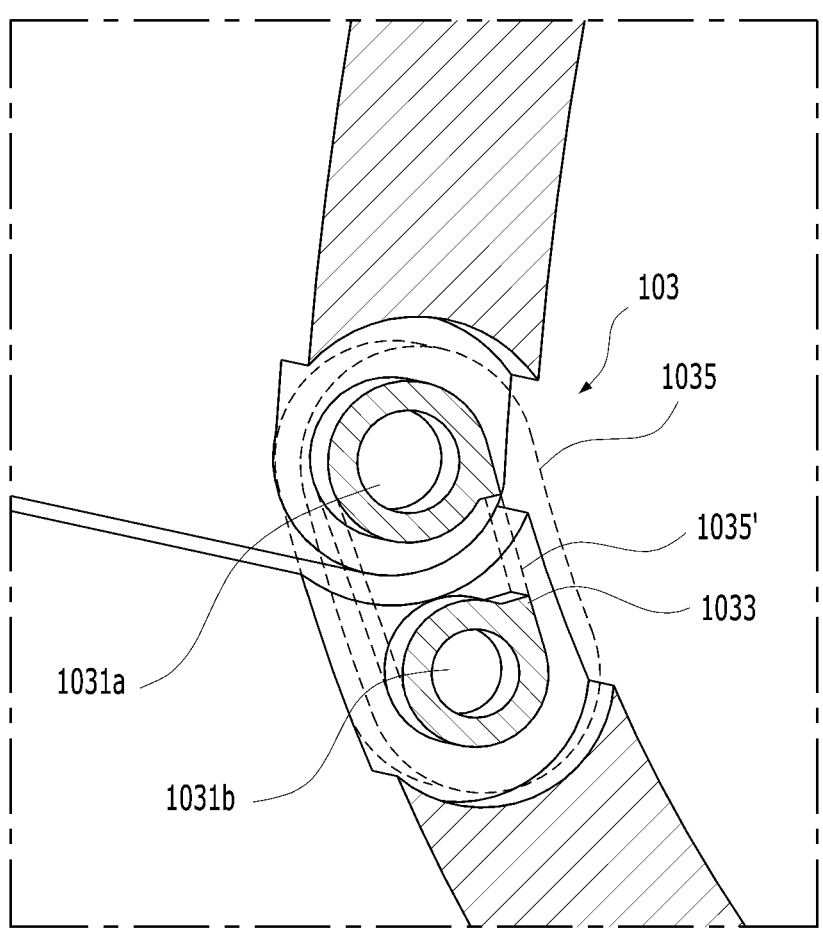
FIG. 16 is a perspective diagram illustrating a curved unit of the mobile terminal shown in FIG. 11.

FIG. 16 is a perspective diagram illustrating the curved unit 103 of the mobile terminal shown in FIG. 11. The curved unit 103 may include a first shaft 1031a coupled to the strap 102 near the main body 101 and a second shaft 1031b coupled to the strap 102 overlapped with the main body 101 in the second status. The strap 102 may rotate on the shafts 1031a and 1031b as its axis to be overlapped with each other as shown in FIG. 15.

A stopper 1033 projected from the shafts 1031a and 1031b to restrict the rotation angle may be further provided to prevent the shape of the strap from being deformed disorderedly into the other shapes except the first status and the second status.

The curved unit 103 may further include a hinge cap 1035 to cover ends of the shafts 1031a and 1031b and a groove 1035' provided in the hinge cap 1035 to insert ends of the shafts therein. At this time, the hinge cap 1035 may have an inner space in which the stopper 1033 projected from the shafts 1031a and 1031b can rotate in a preset range of angles. The stopper 1033 moves only in an extra space and stops when it contacts with a wall surface of the groove 1035' formed in the hinge cap 1035, only to restrict the rotation angle.

Figure 17:
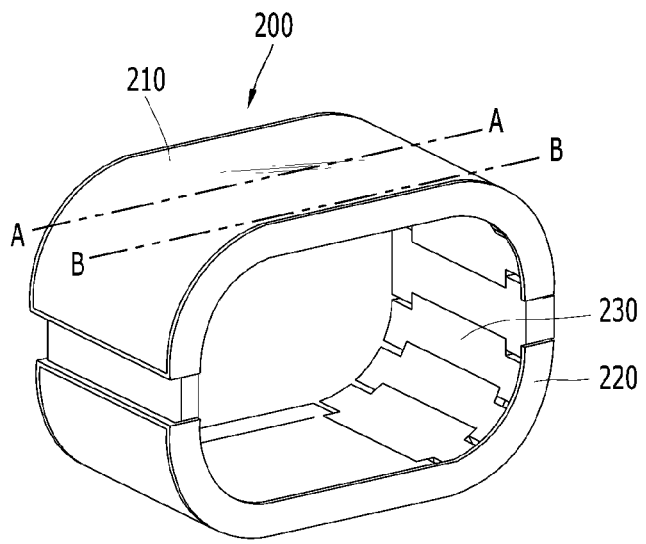
FIG. 17 is a perspective diagram illustrating a watch type mobile terminal in accordance with one embodiment of the present disclosure.
Figure 18:
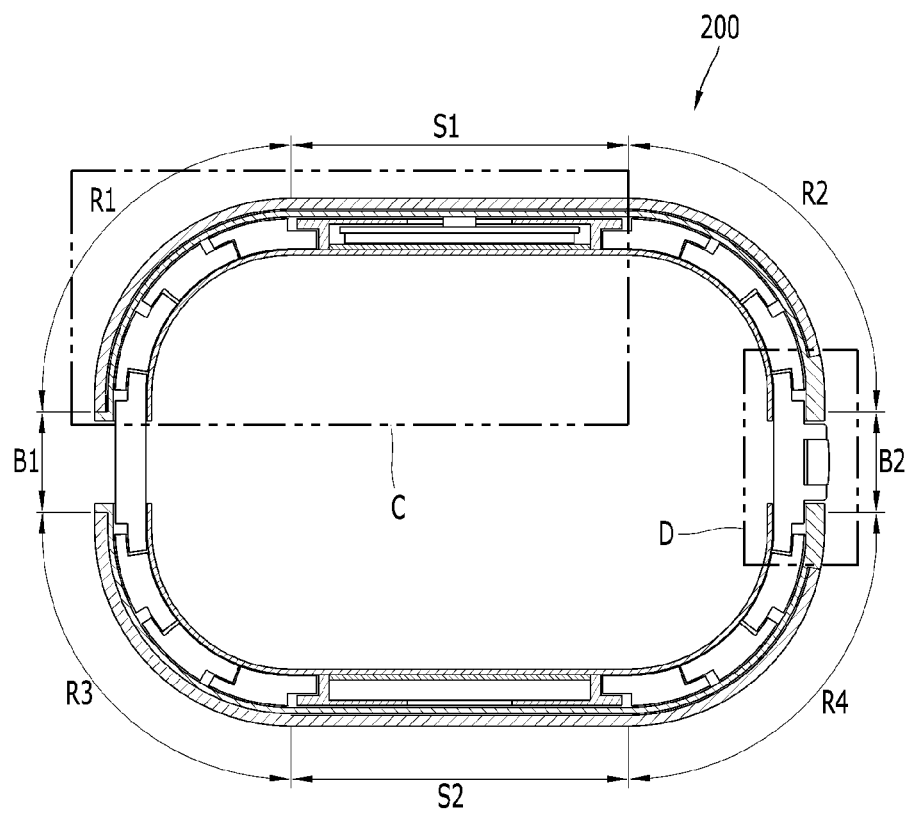
FIG. 18 is a sectional diagram along AA of FIG. 17.

FIG. 17 is a perspective diagram illustrating a watch type mobile terminal in accordance with one embodiment of the present disclosure. FIG. 18 is a sectional diagram along AA of FIG. 17.

Figure 19:
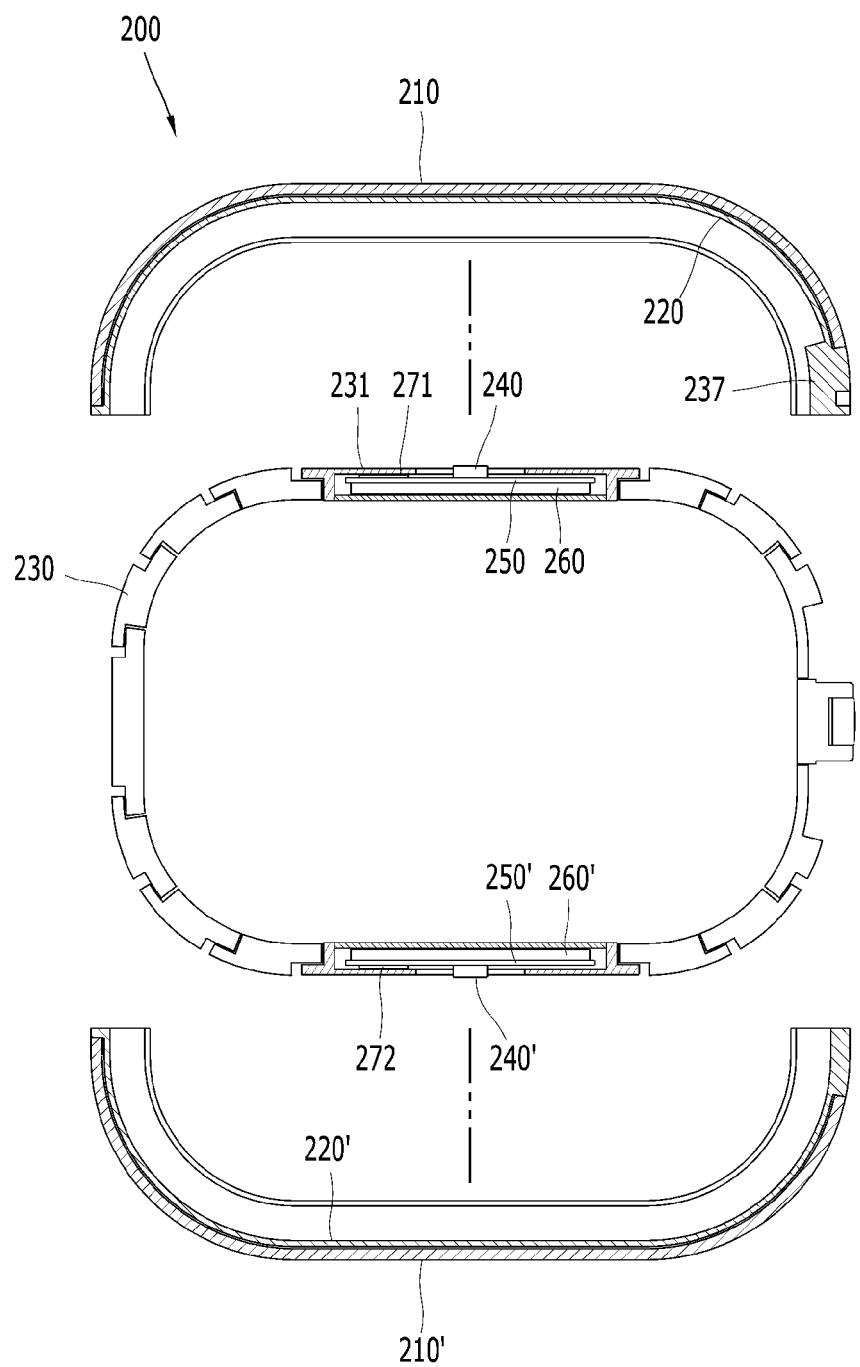
FIG. 19 is an exploded perspective diagram of 18.

Referring to FIGS. 17 to 19, the watch type mobile terminal 200 in accordance with one embodiment of the present disclosure includes a first display 210 having a front surface and a lateral surface, a second display 210' having a rear surface and a lateral surface, with facing the first display 210, a strap module 230 arranged in the first and second displays 210 and 210' to support the first and second displays. Hereinafter, the front surface will mean a surface facing the user's face when the user is wearing the watch type mobile terminal 200, in other words, a surface corresponding to an upper surface of the user's wrist and the rear surface will mean a surface facing the front surface, in other words, a surface corresponding to a lower surface of the user's wrist. The lateral surface will mean a surface corresponding to the user's wrist.

In one embodiment of the present disclosure, the first display 210 and the second display 210' may be expanded to some area of the user's lateral surface as well as to the user's upper surface, so that a more enlarged screen can be realized. The first display 210 and the second display 210' may be expanded to one lateral surface or both lateral surfaces, only to realize an enlarged screen.

At this time, each of the first and second displays 210 and 210' may be a flexible display. The strap module 230 may be bendable together with the bending of the first and second displays 210 and 210'. In case the first and second displays 210 and 210' are bending, the strap module 230 is bending together with the displays. Accordingly, the watch type mobile terminal may provide the sense of unity. At this time, the strap module 230 may be formed of a metallic material.

As they are formed of flexible displays, the first display 210 and the second display 210' can be in contact with the user's wrist closely to enhance the wearing sensation and then a smart watch having an enlarged screen can be realized.

In other words, a display is arranged only in a front surface of a conventional smart watch and the conventional smart watch is formed of a hard material, so that it may be arranged only on an upper surface of the user's wrist. The smart watch in accordance with one embodiment of the present disclosure may be arranged on the upper and lower surface of the user's wrist and partially even to the lateral surface.

For that, the first display 210 shown in FIG. 18 includes a first flat portion S1 formed in a center of the front surface and first curved portions R1 and R2 curved from each side of the flat portion S1. The second display 210' also includes a second flat portion s2 formed in a center of the rear surface and a second curved portion R3 and R4 curved from each side of the second flat portion S2. Electronic components may be loaded in the first flat portion S2 and second flat portion S2. The first flat portion S1 and the second flat portion S2 are corresponding to the upper surface and lower surface of the user's wrist, respectively. The first curved portions R1 and R2 and the second curved portions R3 and R4 are corresponding to lateral surfaces of the user's wrist. At this time, the first display 210 and the second display 210' may cover an overall area of the wrist. However, in one embodiment of the present disclosure, there are some area of the wrist may not be covered with the display, which are exposed areas B1 and B2. The exposed areas B1 and B2 are bezel areas which may not display image information.

As shown in FIGS. 17 and 19, the first display 210 and the second display 210' are exposed outside in the watch type mobile terminal 200. The strap module 230 is curved, corresponding to the first display 210 and the second display 210'. The flat portions S1 and S2, the curved portions R1, R2, R3 and R4 and the bezel areas Ba and B2 may form a shape similar to an appearance of the user's wrist.

A first support material 220 is provided in the rear surface of the first display 210 to accommodate the first display 210, with bending together with the first display 210. A second support material 220' is provided in the rear surface of the second display 210' to accommodate the second display 210', with bending together with the second display 210'. The first and second support materials 220 and 220' may be configured to cover not only the rear surfaces of the first and second displays 210 and 210' but also all of the lateral surfaces of the first and second displays 210 and 210', respectively. In other words, the first and the second support materials 220 and 220' are seated in the first display 210 and the second display 210', respectively.

The strap module 230 may be formed of a hard elastic material and a local area of the strap module can be elastically transformable. The flexible seated in the first and second support materials 220 and 220' and they are formed of a hard elastic material to be transformable. However, the first and second support materials 220 and 220' are formed to have a lower hardness than the hardness of the strap module 230, so that the shape of the first and second support materials 220 and 220' may be determined by the shape of the strap module 230.

The first support material 220 and the second support material 220' are recessed inwardly to fixedly dispose the first display 210 and the second display 210' therein, respectively.

A first printed circuit board (PCB) 250 is disposed in the first flat portion S1 and the PCB 250 is electrically connected to the first display by a first connector 240. A second printed circuit board (PCB) 250' is disposed in the second flat portion S2 and the PCB 250' is electrically connected to the second display 201' by a second connector 240'.

Specifically, the first display 210 is disposed in the first support material 220 and the first display 210 is electrically connected to the first PCB 250 by the first connector 240. A first battery 260 is connected to the first PCB 250 to supply a necessary power to the first display 210.

The first and second displays 210 and 210', the first and second support materials 220 and 220' and the strap module 230 may realize a curved or flat shape. For that, the length of the strap module 230 formed of a metallic material has to be changeable. The strap module 230 in accordance with one embodiment of the present disclosure shown in FIGS. 22 and 23 consists of a plurality of strap pieces 230a and 230c joined by a plurality of pins.

Figure 22:
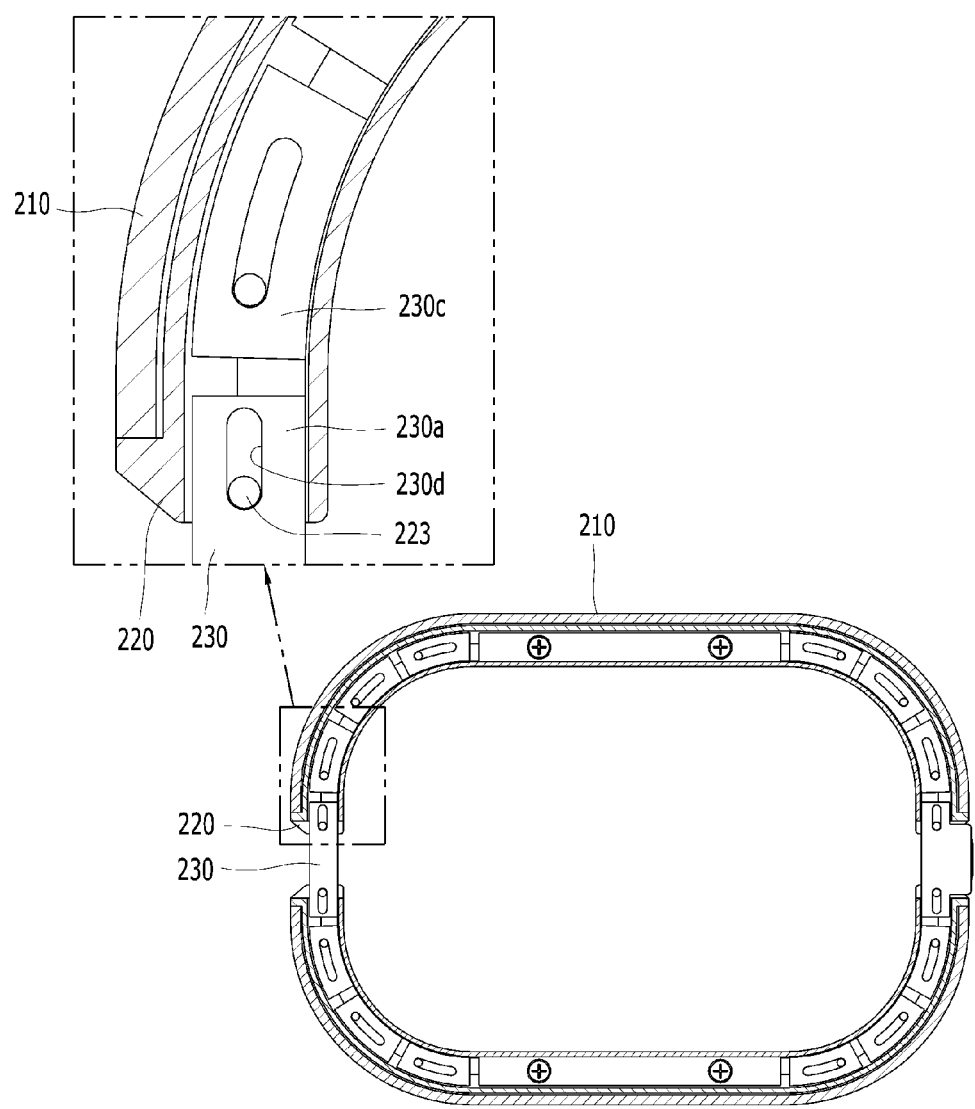
FIG. 22 is a sectional diagram along BB of FIG. 18.

The joint of the strap pieces will be described in detail, referring to FIGS. 22 and 23.

Figure 23A:
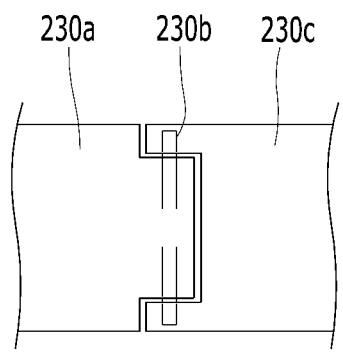
FIGS. 23(a) and 23(b) are conceptual diagrams to describe that strap pieces are connected with each other in accordance with one embodiment of the present disclosure.
Figure 23B:
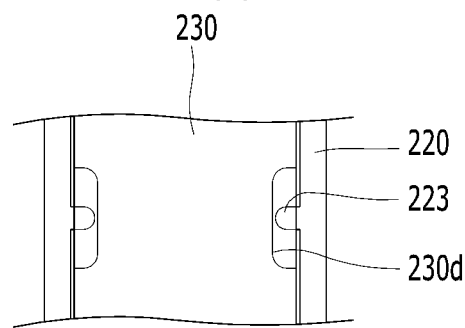

Referring to FIG. 23a, the strap pieces 230a and 230c are joined by a pin 230b. FIG. 23b is a top view of the strap module 230. Referring to FIG. 23b, a long hole 230d is formed in each end of the strap module 230 and a projection 223 projected from the first support material 220 moves in a status of being inserted in the long hole 230d. In other words, the projection 223 may move along a flexing direction as the first support material 220 or the second support material 220' is flexing. For example, FIG. 22 shows that the strap module 230 is bending. When the strap module 230 is bending, the strap module 230 is enlarged more than the first support material 220 is flat. Accordingly, the strap module 230 formed of the metallic material has only the first support material 220, in other words, the projection 223 to move so as to facilitate the first display 210 to form a curved surface. If the first display 210 is changed into the flat surface, the projection 223 moves in the reverse direction to facilitate the first display 210 to form a flat surface.

Such a process may be applied to the second display 210', the second support material 220' and the strap module 230' equally.

Figure 24:
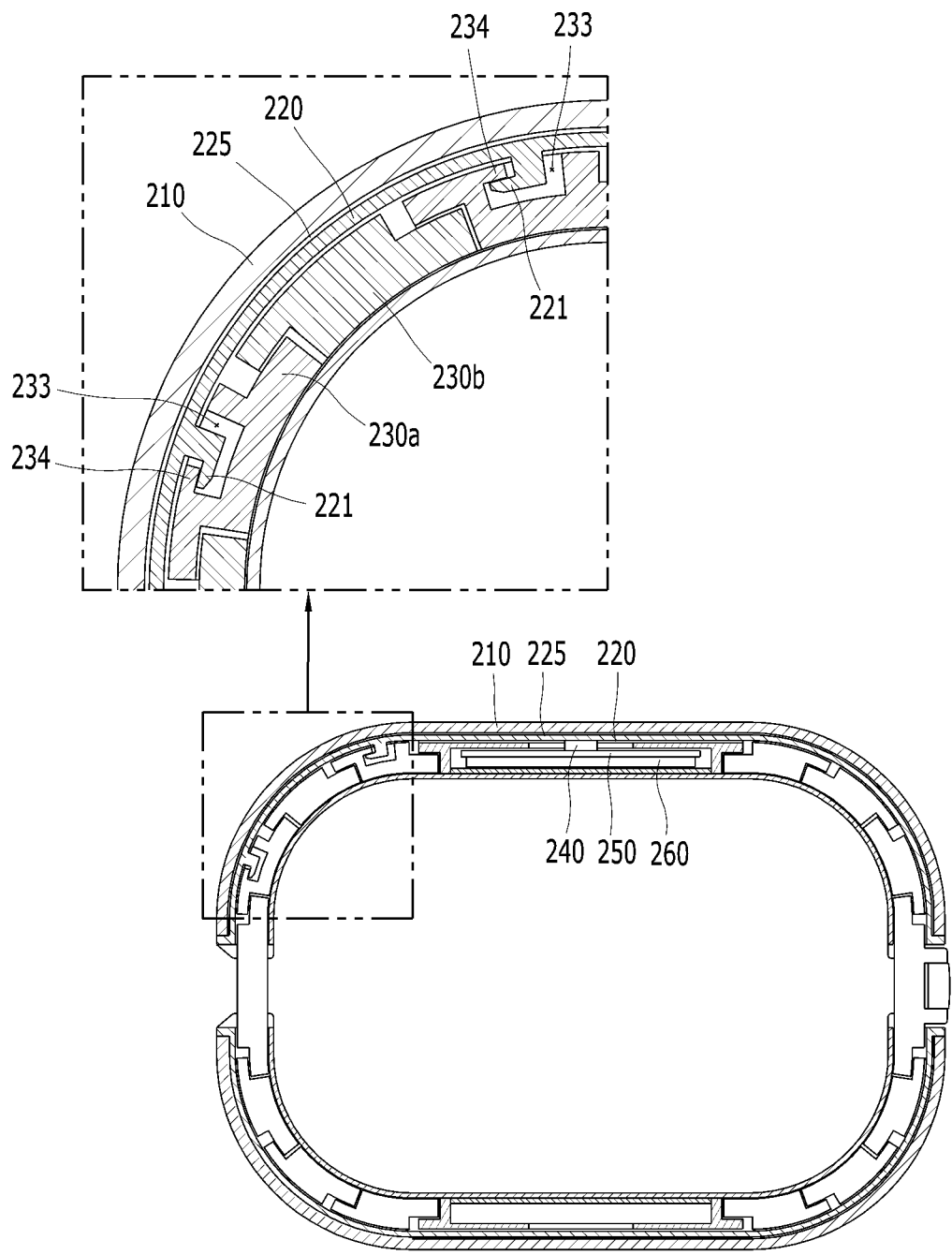
FIG. 24 is another sectional diagram along AA of FIG. 17.
Figure 25A:
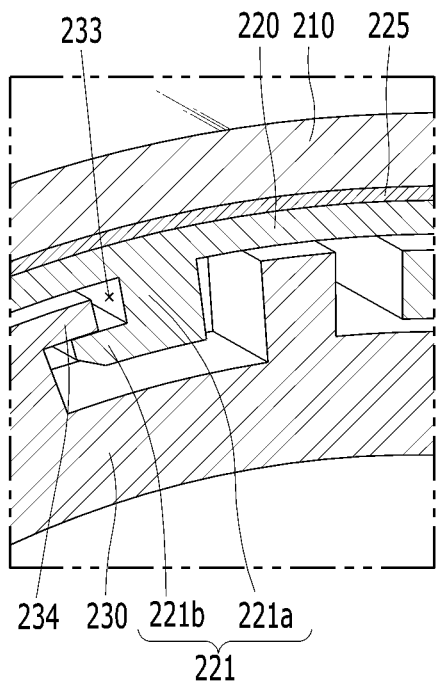
FIGS. 25(a) and 25(b) are partially enlarged view of FIG. 24.
Figure 25B:
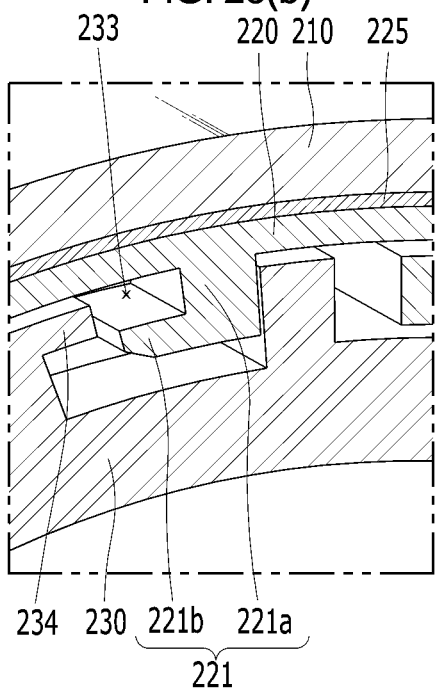
Figure 26:
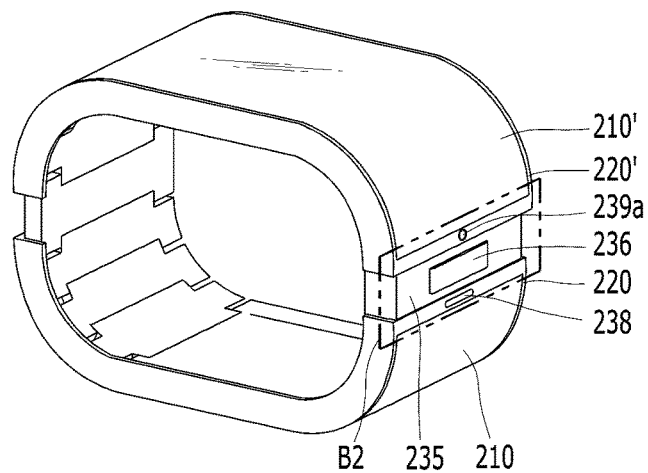
FIG. 26 is another perspective diagram of the watch type mobile terminal in accordance with one embodiment of the present disclosure.
Figure 27:
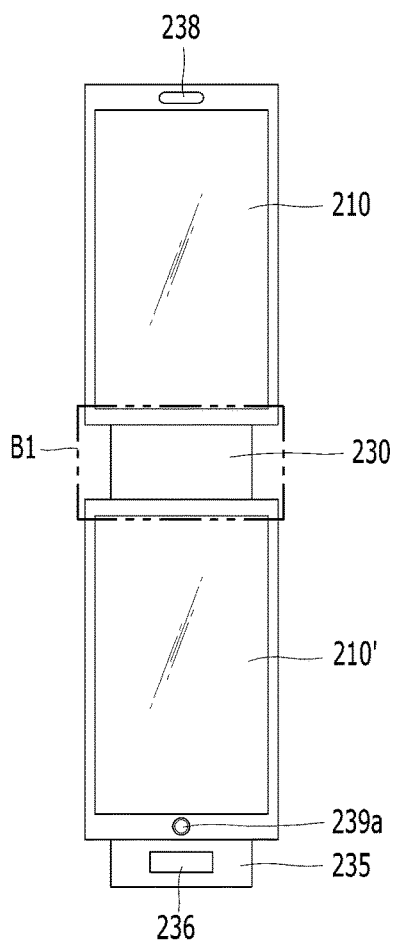
FIG. 27 is a schematic diagram illustrating a status where a watch type mobile terminal in accordance with one embodiment of the present disclosure is spread.

FIG. 24 is another sectional diagram along AA of FIG. 17. FIG. 25 is a partially enlarged view of FIG. 24. Hereinafter, referring to FIGS. 24 and 25, one embodiment will be described in detail.

When the first display 210 is bending, the elasticity acts to make the first display 210 escape outside. To prevent that, a hook 221 is formed in each of the first and second support materials 220 and 220' and a hook securing portion 233 is formed in the strap module 230 to selectively secure the hook 221 thereto. The hook 221 is formed in each center of the first and second support members 220 and 220'. The first display 210 and the second display 210' are disposed in the first support material 220 and the second support material 220' by an adhesive 250, respectively.

For example, when the first display 210 is bending, the force acting to separate the first display 210 from the strap module 230 is increasing. Accordingly, the hook 221 is formed in a rear surface of the first support material 220 and the hook securing portion 233 which is the space where the hook 221 can move is provided in the strap module 230 simultaneously. The hook 221 includes a vertical portion 221a extended from the first support material 220 and a horizontal portion 221b extended from the vertical portion 221a, crossing the vertical portion 221a. When the first display 210 is bending, the horizontal portion 221 is restricted by a restricting portion 234 formed in the strap module 230 to prevent the first display 210 from separating from the strap module 230. The process is applied to the second display 210' equally and detailed description thereof will be omitted accordingly. As mentioned above, the strap module 230 forms the flat or curved surface in the embodiment. When the hook 221 is moved to form the curved surface, the hook 221 has the structure configured to prevent the first display 210 from separating outwardly.

At this time, the hook 221 and the hook securing portion 233 may be formed in the curved portions R1, R2, R3 and R4.

Figure 20:
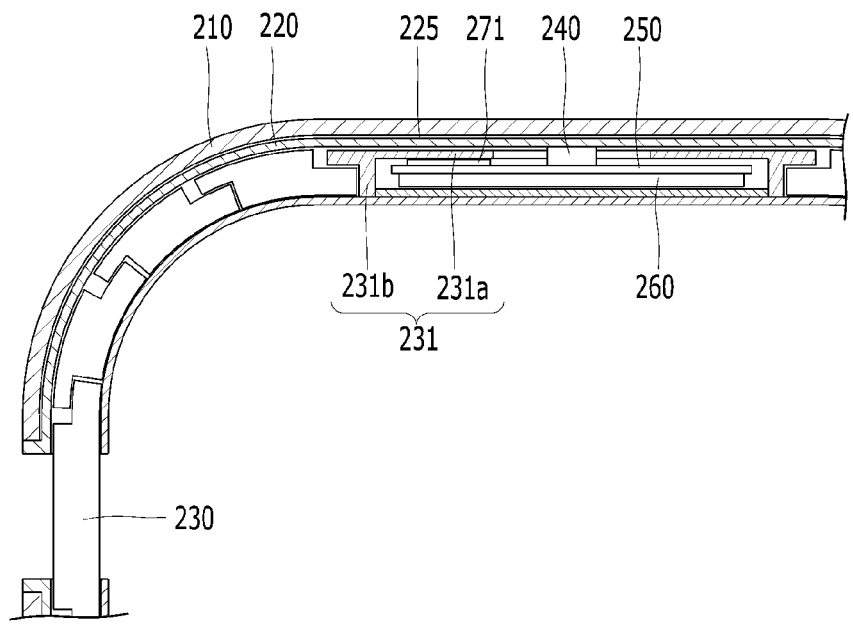
FIG. 20 is an enlarged view illustrating 'C' of FIG. 18.
Figure 21:
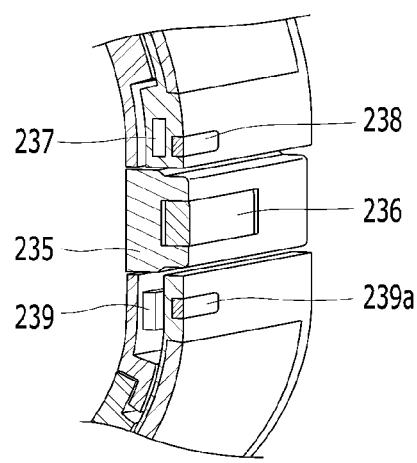
FIG. 21 is an enlarged view illustrating 'D' of FIG. 18.
Figure 28A:
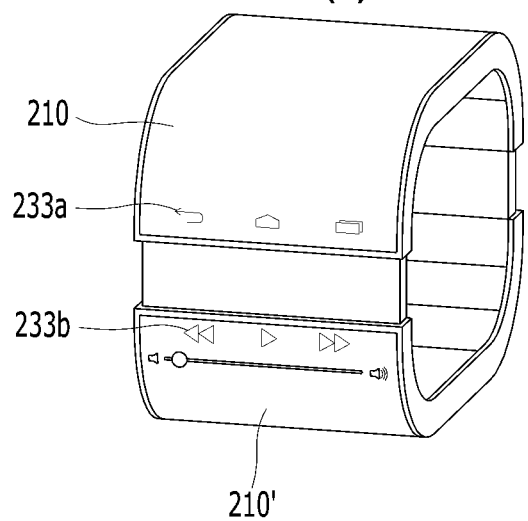
FIGS. 28(a) and 28(b) are diagrams illustrating what is realized on a display in accordance with one embodiment of the present disclosure.

FIG. 20 is an enlarged view of C shown in FIG. 18 and FIG. 21 is an enlarged view of D shown in FIG. 18. Both ends of the first display 210 and both ends of the second display 210' are arranged adjacent to each other, only to form the bezel areas B1 and B2 (see FIG. 18). The first display 210 and the second display 210' adjacent to each other may be functioned as a single display. For example, the first display 210 implements a first function and the second display 210' supports the first function or implements a second function different from the first function. As shown in FIG. 28a, a first manipulation unit 223a is formed on the first display 210 and a second manipulation unit 223 is formed on the second display 210'. Accordingly, main functions may be manipulated through the first manipulation unit 223a and play speed control and sound control of multimedia such as music or video may be manipulated through the second manipulation unit 223b.

Figure 28B:
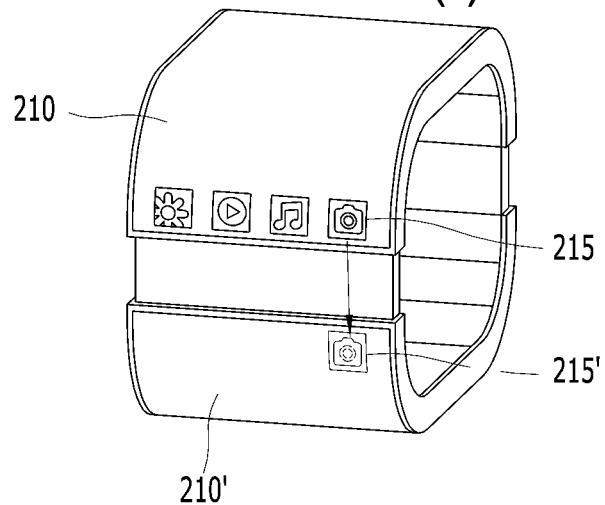

As shown in FIG. 28b, some of the icons formed in the first display 210 are dragged to the second display 210'. The icon 215' moved to the second display 210' implements the same function before moved.

To make the first display 210 and the second display 210' communicate with each other, short range wireless communication (i.e., Bluetooth) has to be provided. For that, in one embodiment of the present disclosure, a first antenna 271 is arranged in the first flat portion S1 and a second antenna 272 is arranged in the second flat portion S2. The first antenna 271 and the second antenna 272 transmit and receive signals to and from each other, to implement functions organically. The first antenna 271 and the second antenna 272 are arranged on the first printed circuit board 250 and the second printed circuit board 250', respectively.

Figure 29:
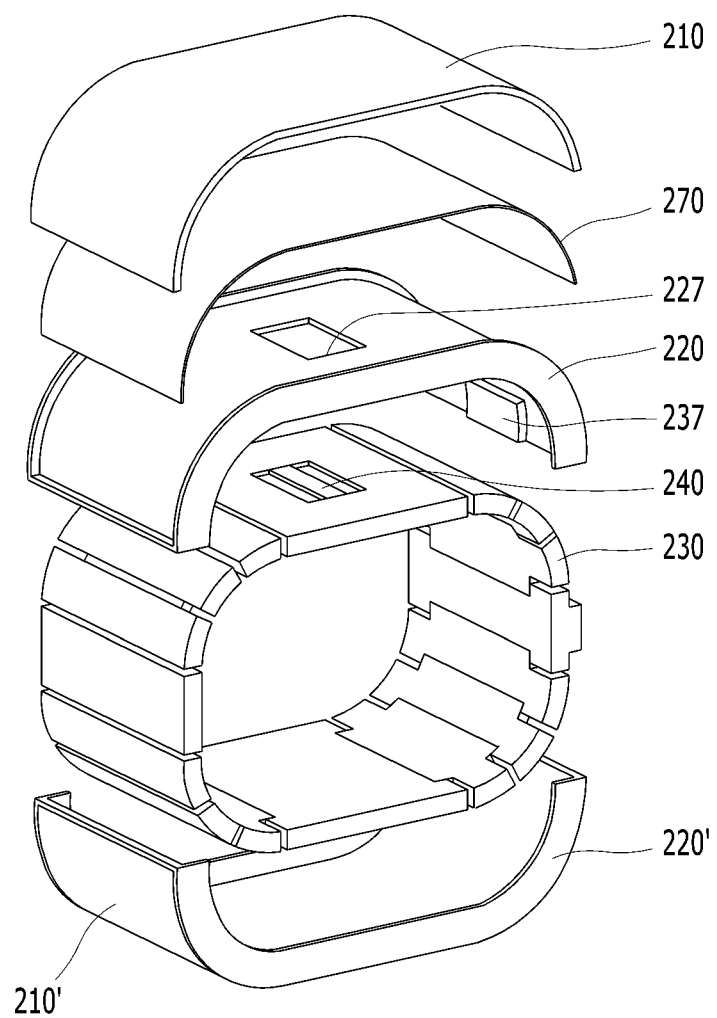
FIG. 29 is an exploded perspective diagram of a watch type mobile terminal including a charging film in accordance with one embodiment of the present disclosure.
Figure 30:
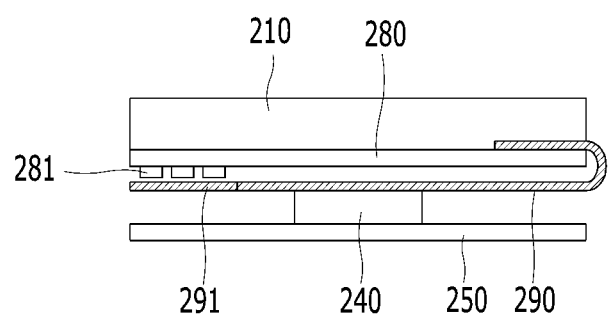
FIG. 30 is a conceptual diagram illustrating connection between a printed circuit board and the charging film in accordance with one embodiment of the present disclosure.

As shown in FIG. 29, a charging film 270 may be arranged between the first display 210 and the first support material 220 in one embodiment of the present disclosure. The charging film 270 is electrically connected to the first printed circuit board 250 by a flexible printed circuit board 290 to prepare for dead of the first battery 260. As shown in FIG. 30, an electrode pad 291 is formed in one end of the flexible printed circuit board 290 and the first connector 240 is connected to the first printed circuit board 240 and the flexible printed circuit board 290 through a hole 227 formed in the first support material 220. A plurality of electrodes 281 may be provide in a lower surface of the charging film 270 and the electrodes 281 are in contact with the electrode pad 291.

At this time, the charging film 270 may be useable while the watch type mobile terminal is used. The charging film 270 is functioned as a supplementary battery for dead of the battery 260. The charging film 270 is charged by solar light and it may be a screen which can generate its own solar energy. A lens (not shown) for collecting solar light and a transparent solar cell (not shown) are loaded in the charging film 270, so that solar energy can be collected for the self-charging, when the charging film 270 is exposed to solar light.

A charging film may be also arranged between the second display 210' and the second support material 220' to prepare for dead of the second battery 260'.

As mentioned above, both ends of the first display 210 are spaced apart a preset distance from both ends of the second display 210', to form the bezel areas B1 and B2. At this time, one distance between the first display and the second display 210' is relatively narrow when they are screens toward the user's face (for example, an area including B1). The other distance between the first display 210 and the second display 210' is wider than the distance between the first display 210 and the second display 210', when they are screens toward the reverse of the user's face (for example, an area including B2). That is one of examples and the other distance in the screens toward the reverse of the user's face may be narrower. At this time, when the icon 215 associated with the multimedia playing or the manipulation units 223a and 223b are realized in the screen toward the user's face and a function associated with making or receiving a call is realized in the screen toward the reverse of the user's face, a distance between an audio hole 238 and a microphone hole 239a is not so important. Accordingly, it does not matter when the distance between the first display 210 and the second display 210' is wide.

The strap module 230 is coupled to each other and decoupled from each other by a buckle 235. The buckle 235 is operated by a button 236. A receiver 237 and an audio hole 238 are arranged in a portion of the buckle 235. A microphone 239 and a microphone hole 239a are arranged in the other portion of the buckle 235. In general, the buckle 235 may be located in a lower portion of the user's wrist. However, in one embodiment of the present disclosure, the second display 210' is provided in the lower portion of the user's wrist and the buckle 235 is arranged in a lateral side of the user's wrist.

It is disclosed that the two displays 210 and 210' are realized. However, the embodiments of the present disclosure are not limited thereto and only the first display 210 may be realized. In this instance, the second display 210' and the second support material 220' are omitted and components loaded in the second flat portion S2 are omitted, which are replaced by the strap module 230. In addition, the second display 210' and the second support material 220' may be detachable. In this instance, the second connector 240' may be exposed outside. Referring to FIG. 20, a flat plate 231 is formed in the first flat portion S1 and the plate 231 includes a horizontal portion 231a and a vertical portion 231b. The vertical portion 231b and the horizontal portion 231a define a space where various electronic components are loaded. Examples of the electronic components include the battery 260, the printed circuit board 250 and the antenna 271. If the first display 210 and the first support material 220 are removed, the first connector 240 is exposed outside. The process is associated with the first display 210 and the first support material 220 and it may be applied to the second display 210' and the second support material 220'.

Figure 31A:
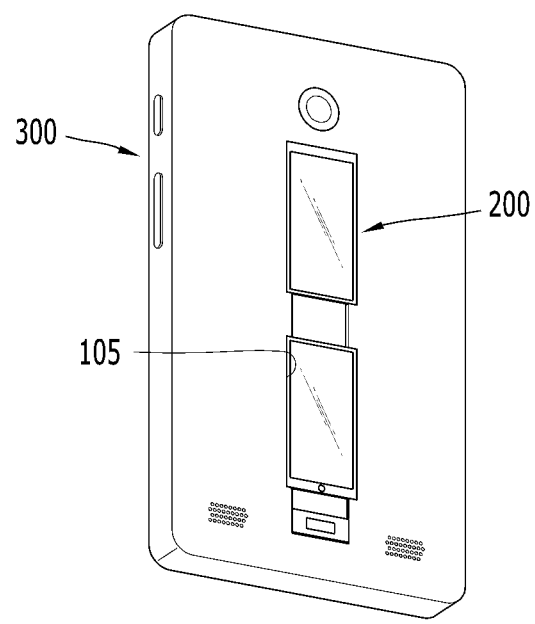
FIGS. 31(a) and 31(b) are conceptual diagrams of a mobile terminal assembly in accordance with one embodiment of the present disclosure.
Figure 31B:
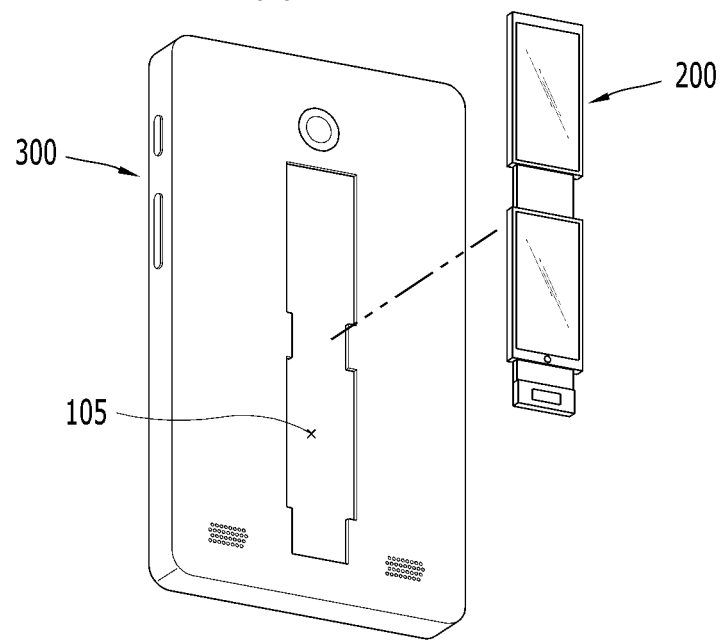

FIG. 31 is a conceptual diagram of a mobile terminal assembly in accordance with one embodiment of the present disclosure. FIG. 31a illustrates a status where the watch type mobile terminal 200 is attached to a mobile terminal 300 and FIG. 31b illustrates a status where the watch type mobile terminal 200 is detached from the mobile terminal 300.

As shown in FIG. 31a, an accommodating recess 215 is formed in a rear surface of the mobile terminal to accommodate the watch type mobile terminal 200. As it is accommodated by the mobile terminal 300, the watch type mobile terminal 200 may be charged or use sensors loaded in the mobile terminal 300. In addition, data of the watch type mobile terminal 200 may be transmitted to the mobile terminal 300. A C-clip, pogo pin or a connector may be used in electrically connecting the watch type mobile terminal 200 to the mobile terminal 300 and other manners may be used.

Figure 32A:
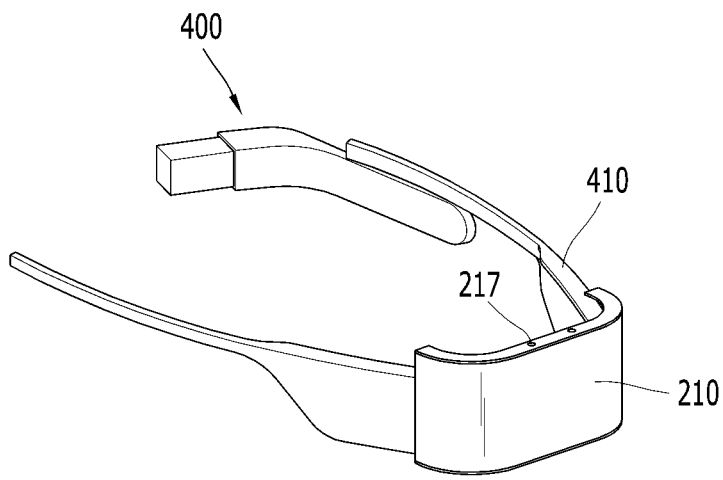
FIGS. 32(a) and 32(b) are conceptual diagrams of another mobile terminal assembly in accordance with one embodiment of the present disclosure.
Figure 32B:
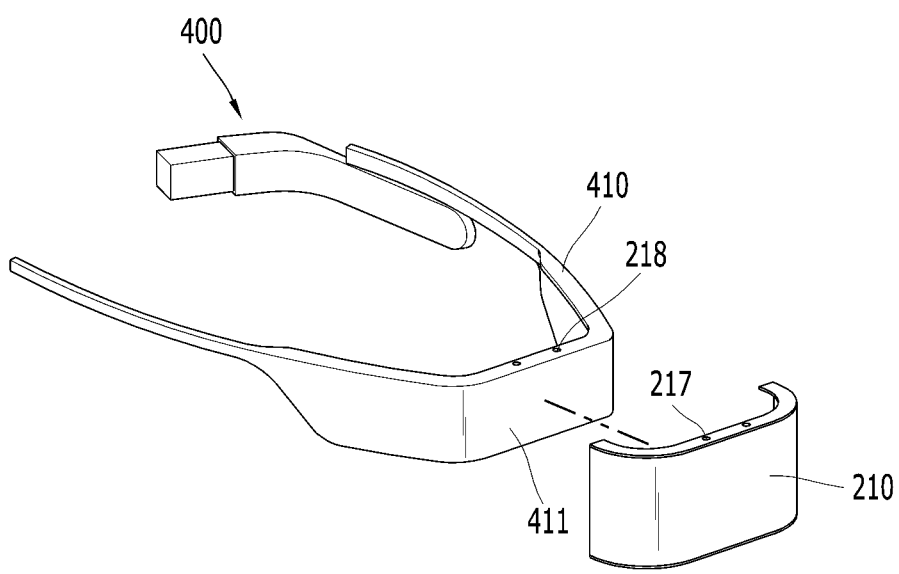

As shown in FIG. 32, the display 210 may be used as one component composing a glass type mobile terminal 400. In other words, the glass type mobile terminal 400 includes a rear rest supported by a back side of the user's head. A flat stand 411 is formed in a center of the rear rest 410. The display 210 is coupled to the stand 411. For the coupling, a hole 218 is formed in the stand 411 and the display 210 is coupled to the stand 411 by a coupling member 217. At this time, the display 210 provides information associated with a rear view. For example, the display 210 provides a person behind with the local time.

According to one or more embodiments of the present disclosure as mentioned above, the mobile terminal may be deformable into convenient types for different situations, so that the mobile terminal can satisfy both portability and usability.

In addition, when the mobile terminal is deformed into the watch type mobile terminal, the overall thickness of the mobile terminal may be uniform, so that the mobile terminal having an excellent design quality may be provided. The display unit 151 may be flexible and the mobile terminal may provide the display unit 151 having a large screen even when it is deformed into the watch type.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A deformable mobile terminal comprising:
a main body:
a display mounted to a front surface of the main body;
a strap coupled to a first and a second side of the main body; and
folding units that fold the strap,
wherein the strap, in a first configuration of the mobile terminal, is curve-shaped and, together with the main body, forms a closed loop structure, and
wherein when the strap is folded by the folding units, at least the strap overlaps with the main body, in a second configuration of the mobile terminal, to form a bar type mobile terminal.

2. The mobile terminal of claim 1 further comprising:
an electronic component mounted in the strap; and
a flexible board extending from an inner portion of the strap to the main body and connecting the electronic component with the display unit.

3. The mobile terminal of claim 2, wherein the strap comprises:
a first strap having a first end connected to the first side of the main body; and
a second strap having a first end connected to the second side of the main body, and wherein a second end of the first strap and a second end of the second strap are configured to be detachably connected to each other.

4. The mobile terminal of claim 3 further comprising:
a hook attached to the second end of the first strap; and
a hook securing portion associated with the second end of the second strap, the hook securing portion configured to secure the hook thereto.

5. The mobile terminal of claim 4 further comprising:
an elastic portion configured to apply a force to the hook to secure the hook to the hook securing portion; and
a button configured to counter the force applied by the elastic portion on the hook, when the button is pressed, so that the hook is no longer secured by the hook securing portion and the first strap and the second strap detach from each other.

6. The mobile terminal of claim 3, wherein the electronic component comprises:
a printed circuit board mounted in the first strap; and
a battery mounted in the second strap, wherein the printed circuit board and the battery are disconnected when the first strap and the second strap are detached and connected when the first strap and the second strap are attached.

7. The mobile terminal of claim 1, wherein the strap and the main body are detachable from each other.

8. The mobile terminal of claim 1 further comprising:
a first magnet on the main body; and
a second magnet on the strap, wherein the first magnet and the second magnet have opposite polarities and wherein the first magnet and the second magnet adhere to each other and maintain the mobile terminal in the second configuration as a bar type mobile terminal.

9. The mobile terminal of claim 1, wherein the main body and the display unit are flexible.

10. The mobile terminal of claim 9 further comprising:
a plurality of unit blocks in the main body extending lengthwise in a first direction parallel to the first and second sides of the main body and, sequentially arranged in a second direction perpendicular to the first and second sides of the main body,
slots recessed on two lateral surface of first direction of the plurality of unit blocks, and extend across in second direction; and
a plurality of projections, each projecting from an inner portion of the main body and into the slots of a corresponding one of the plurality of unit blocks,
wherein each of the projections is configured to move along the corresponding slot such that the angle between adjacent unit blocks changes when the shape of the main body is deformed to place the mobile terminal in the first configuration.

11. The mobile terminal of claim 1 further comprising:
a plate spring in the strap, the plate spring formed of a flexible material, wherein the shape of the strap in the first and second configurations is determined, at least in part, by the curvature of the plate spring.

12. The mobile terminal of claim 11, wherein the plate spring comprises:
a rectangular outer frame;
a plurality of deformable frames within the outer frame, wherein the plurality of deformable frames are arranged in a first direction parallel to the first and second sides of the main body extending from one side of the outer frame and the other side of the outer frame in a second direction perpendicular to the first and second sides of the main body; and
a middle frame located crossing the plurality of deformable frames,
wherein the rectangular outer frame and the middle frame is not deformed and the plurality of deformable frames change a shape when the mobile terminal changes between the first and second configurations.

13. The mobile terminal of claim 1, wherein each of the folding units is a hinge having two shafts.

14. The mobile terminal of claim 13, wherein an end portion of each shaft includes a stopper projecting therefrom, wherein a hinge cap covers the end portions of both shafts, and wherein the hinge is configured to rotate until the stoppers make contact with the hinge cap.

15. The mobile terminal of claim 1 further comprising:
one or more of a microphone and an audio output module mounted in the strap, closer to the main body than the folding units.

16. The mobile terminal of claim 1, wherein the folding units place both ends of the mobile terminal in a second configuration.

17. A deformable mobile terminal comprising:
a strap module deforming between a first configuration forming a closed loop structure and a second configuration forming a bar shape;
a first support material arranged on a first part of the strap module;
a second support material on a second part of the strap module;
a first flexible display mounted on the first support material;

a second flexible display mounted on the second support material, the second flexible display facing opposite side from the first flexible display in a second configuration, wherein the first and the second displays are curved when the mobile terminal is in the second configuration.

18. The deformable mobile terminal of claim 17, wherein when the mobile terminal is in the first configuration, each of the first display and the second display comprises a flat portion, a first curved portion to one side of the flat portion and a second curved portion to another side of the flat portion, opposite the first curved portion.

19. The deformable mobile terminal of claim 17 further comprising:

a charging film between the first display and the first support material and between the second display and the second support material, wherein a lateral surface of each of the first and second support materials covers, at least in part, a lateral surface of the strap module, and wherein a projection projects from a lateral surface of each of the first and second support materials, the projections being movable along a corresponding slot formed in a lateral surface of the strap module.

20. A mobile terminal assembly comprising:

an outer surface with an accommodating recess formed therein, wherein the accommodating recess is configured to receive the mobile terminal of claim 17 and to electrically connect the mobile terminal of claim 17 to the mobile terminal assembly.

* * * * *